(12) United States Patent
Shibuya

(10) Patent No.: US 6,442,175 B1
(45) Date of Patent: Aug. 27, 2002

(54) DIGITAL ONE-LINK RELAYING SYSTEM FOR COMMUNICATION DATA IN A CELL TRANSMISSION NETWORK

(75) Inventor: Kazuhiro Shibuya, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/123,083

(22) Filed: Jul. 27, 1998

(30) Foreign Application Priority Data

Oct. 28, 1997 (JP) ............................................. 9-296021

(51) Int. Cl.[7] ................................................. H04J 3/22
(52) U.S. Cl. ....................... 370/474; 370/477; 370/252; 370/395.3
(58) Field of Search .......................... 455/517; 704/221, 704/212; 375/219, 222; 370/474, 259, 395, 465, 395.1, 477, 252, 395.3, 389

(56) References Cited

U.S. PATENT DOCUMENTS 4,924,480 A * 5/1990 Gay et al. .................... 375/222
5,768,308 A * 6/1998 Pon et al. .................... 375/219
5,956,673 A * 9/1999 Weaver, Jr. et al. ......... 704/221
6,108,560 A * 8/2000 Navaro et al. ............... 455/517

* cited by examiner

*Primary Examiner*—Hassan Kizou
*Assistant Examiner*—John Pezzlo
(74) *Attorney, Agent, or Firm*—Katten Muchin Zavis Rosenman

(57) ABSTRACT

When passing-particular-equipment identification data which indicates passing particular transmission equipment has been detected, two opposing CLAD blocks exchange items of information on the transmission or reception addresses of ATM cells in the respective CLAD blocks, via an exchange (#2). Besides, each CLAD block or an ATM cell switch block alters the route of the cell inside the transmission equipment, on the basis of the exchanged information. In consequence, the ATM cell left intact can be relayed toward its destination without causing voice data itself to pass through the exchange (#2). As a result, the numbers of times of coding/decoding and cell assembling/disassembling operations for the voice data match the numbers of times corresponding to one link of transmission equipment.

6 Claims, 18 Drawing Sheets

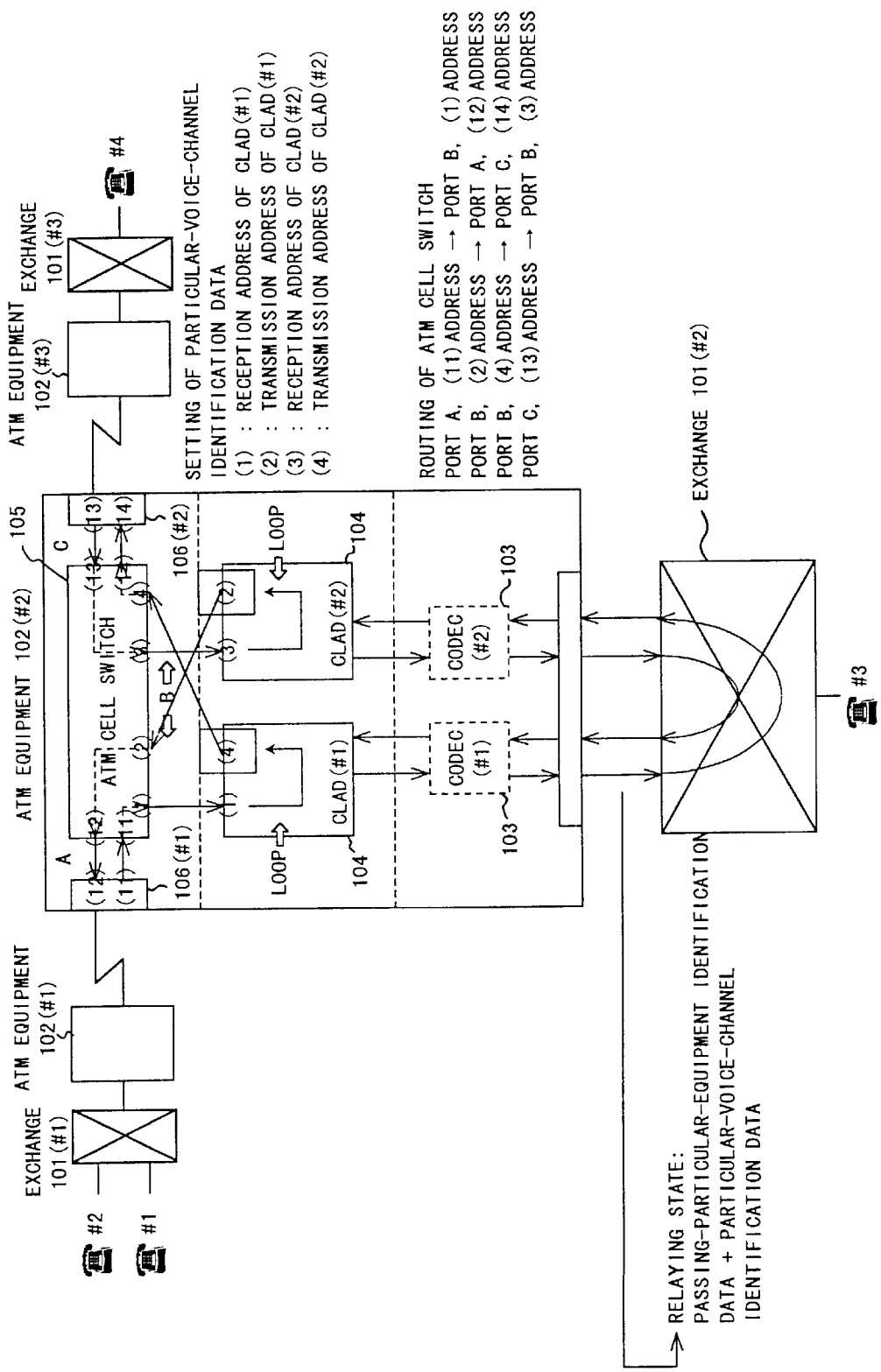
F I G. 8

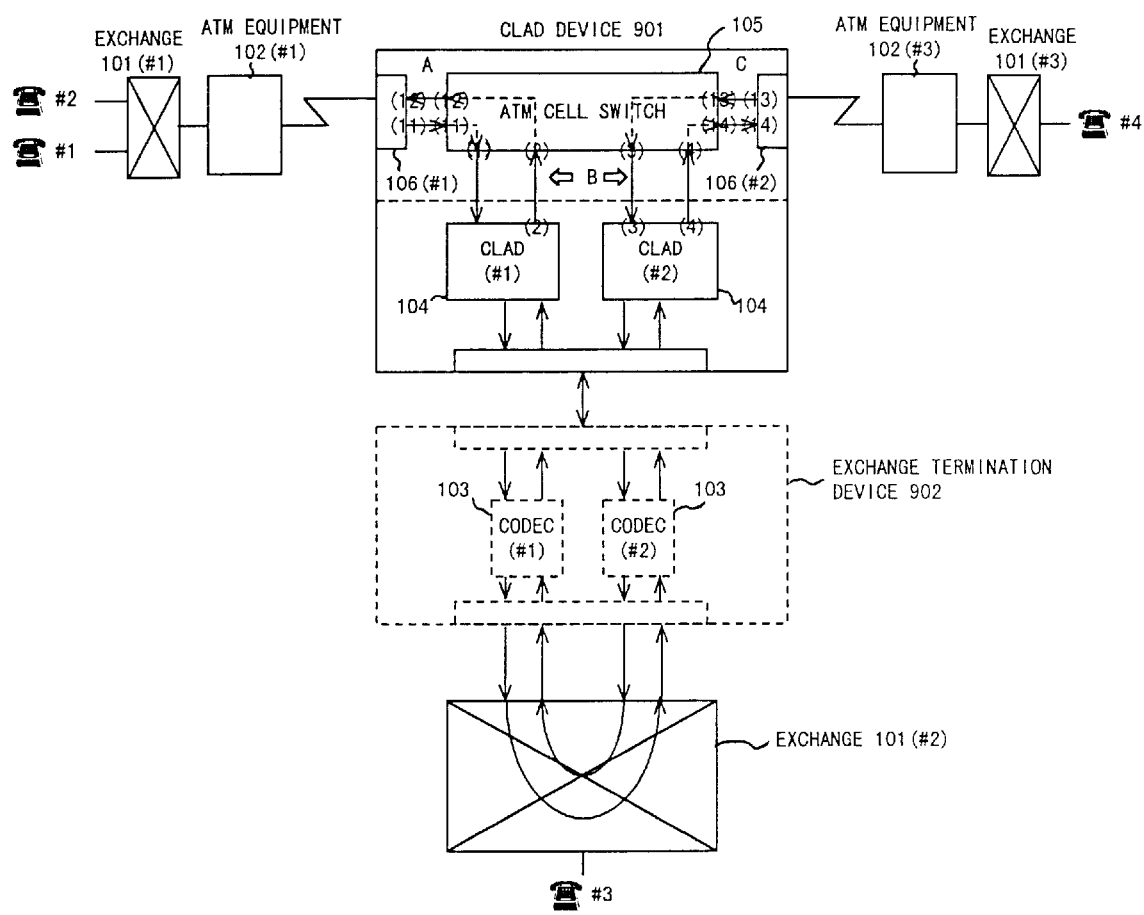
F I G. 1 3

DIGITAL ONE-LINK RELAYING SYSTEM FOR COMMUNICATION DATA IN A CELL TRANSMISSION NETWORK

BACKGROUND OF THE INVENTION

1. Field of the Invention

The present invention relates to technology for enhancing the communication quality of communication data such as voice data, when the data is relayed by transmission equipment in a network which transmits fixed-length cells, such as an ATM (asynchronous transfer mode) network.

2. Description of the Related Art

In a case where TDM (time division multiplexing) equipment are to be replaced with ATM equipment by exploiting a direction selecting function based on exchanges which are used in an existing network built up of the TDM equipment, it is requested that voice of short delay and high quality having been obtained in the TDM network be maintained even after the shift to the ATM network.

FIG. 1 is a diagram showing the architecture of a prior-art, voice data relaying system which employs TDM equipment.

In each TDM equipment 1502 for connecting exchanges 1501 as shown in FIG. 1, the delay (transmission delay) of data within the equipment is slight. Therefore, even when the voice data is relayed by the plurality of TDM equipment 1502, the delay thereof poses no problem.

However, in a case where a CODEC (coder/decoder) block being a device which codes and decodes voice data by the use of compression technology is installed in each TDM equipment 1502 in order to effectively utilize a transmission line, the relaying of the voice data by the plurality of TDM equipment 1502 results in degrading the communication quality of this voice data. The reason therefor is that the operations of voice coding/decoding are repeated for the number of times corresponding to the number of times of relaying, to increase the degradation of a voice quality attributed to the coding/decoding and the delay of the voice data attributed to voice compression.

In the example of FIG. 1, the TDM equipment 1502(#2) to which the exchange 1501(#2) of a relay station is connected between the exchange 1501(#1) in which a telephone set having called out is accommodated and the exchange 1501(#3) in which a telephone set to call to is accommodated. On this occasion, the degradation of the communication quality of the voice data increases in the two CODEC blocks which are included in the TDM equipment 1502(#2).

There have been known various techniques collectively called digital one-link relaying technology wherein, in order to prevent the delay and the quality degradation which are incurred by the coding/decoding of the voice data in the relaying office, the voice data is not coded/decoded in the TDM equipment 1502(#2) serving as the relaying office, whereby the number of times of the operations of coding/decoding the voice data matches the number of times corresponding to one link of the TDM equipment 1502.

In the example of FIG. 1, in a case where the exchange 1501(#2) does not operate as the relaying office, that is, in a case where the exchange 1501(#2) is an office to which a telephone set having called out is connected or an office to which a telephone set to call in is connected, the CODEC block of the TDM equipment 1502(#2) functions, so that the data which is transmitted between the TDM equipment 1502(#2) and the exchange 1501(#2) becomes decoded original voice data.

On the other hand, in a case where the exchange 1501(#2) operates as the relaying office, the CODEC blocks of the TDM equipment 1502(#2) do not function, so that the data which is relayed and transmitted in both ways between the TDM equipment 1502(#2) and the exchange 1501(#2) remains coded voice data.

In this case, the data which is transmitted bears passing-particular-equipment identification data for identifying whether or not the exchange 1501(#2) is to operate as the relaying office (that is, whether or not the particular equipment is to be passed). The TDM equipment 1502(#2) judges the passing-particular-equipment identification data, whereby the CODEC blocks are controlled to be valid/invalid.

Owing to such digital one-link relaying technology, voice communications of high quality can be realized in the TDM network even when a plurality of relaying equipment exist.

Meanwhile, in recent years, it has come to be eagerly requested that a TDM network be replaced with an ATM network for the purposes of heightening the transmission speed of communications and enlarging the traffic volume thereof.

FIG. 2 is a diagram showing the architecture of a prior-art, voice data switching system which employs ATM equipment 1601 substituted for the TDM equipment 1502 in the TDM network depicted in FIG. 1.

Referring to FIG. 2, a CLAD (cell assembly/disassembly) block installed in each ATM equipment 1601 is a device which assembles voice data into an ATM cell and which disassembles an ATM cell into voice data.

Besides, an ATM cell switch block installed in each ATM equipment 1601 operates as illustrated in FIG. 3. More specifically, the ATM cell switch block analyzes destination information affixed to the header part of the ATM cell which is entered from a port lying on the side of the CLAD block, so as to switch the ATM cell in the direction of a destination, and it alters the destination information of the header part to one corresponding to the next relaying destination and then delivers the resulting ATM cell to a port lying on the side of a transmission line. Also, regarding the ATM cell which is reversely entered from a port lying on the side of the transmission line, the ATM cell switch block analyzes destination information affixed to the header part of the entered ATM cell so as to switch this cell, and it alters the destination information of the header part and then delivers the resulting ATM cell to a port lying on the side of the CODEC block as corresponds to the next destination.

In general, a data transmission rate at the input/output port of an ATM cell switch block to which a CLAD block is connected is very high, so that the input/output port can process data of large traffic volume (ATM cell). In contrast, since data to be processed by the CLAD block is only voice data, a data processing rate in the CLAD block is much lower than the data transmission rate at the input/output port of the ATM cell switch block. In order to effectively use the data transmission capacity of the input/output port of the ATM cell switch block, therefore, a plurality of CLAD blocks are often connected to one input/output port.

In the architecture depicted in FIG. 2, the ATM equipment 1601 form paths which are always fixed, among the respective exchanges 1501.

With the prior art illustrated in FIG. 2, however, the process for assembling or disassembling the ATM cell for the voice data is required in the CLAD block within each ATM equipment 1601 even in the case of adopting the vocal digital one-link relaying technology which employs the passing-particular-equipment identification data or the like and which has been realized in the TDM network. The prior art therefore has the problem that delays ascribable to the cell assembly/disassembly in the two CLAD blocks within the ATM equipment 1601 to which the exchange 1501(#2) of the relaying office is connected are accumulated, resulting in the increase of a delay in the understanding of the voice data.

FIG. 4 is a diagram showing the architecture of another prior-art, voice data relaying system which employs ATM equipment 1601 substituted for the TDM equipment 1502 in the TDM network depicted in FIG. 1.

The architecture in FIG. 4 differs from the architecture in FIG. 2 in the point that a signalling termination block for receiving and analyzing the signalling information of voice is installed in each ATM equipment 1601, and that a dynamic path extending from a calling office (the exchange 1501 in which a telephone set having called out is accommodated) to a final called office (the exchange 1501 in which a telephone set to call in is accommodated) is formed in the ATM network by the controls of the signalling termination blocks.

With the architecture illustrated in FIG. 4, the ATM equipment 1601(#5) does not operate, in itself, as a relaying office for transferring voice data to-be-relayed to the exchange 1501(#4), but it directly switches the ATM cell of the voice data to-be-relayed toward the final called office by means of the ATM cell switch block.

In the above prior art shown in FIG. 4, the ATM cell for the voice data to-be-relayed is not assembled/disassembled by the CLAD in the ATM equipment 1601(#5) which operates as a relaying office for relaying the voice data, and hence, a delay ascribable to the cell assembly/disassembly does not occur in this relaying office.

The prior art shown in FIG. 4, however, has the problem that the signalling termination block needs to be installed in each ATM equipment 1601, and that management data for deciding the final called office on the basis of the signalling information is required.

Besides, with the prior art shown in FIG. 4, the main constituents of the relaying become the ATM equipment 1601, not the exchanges 1501, in the case where the conventional TDM network has been altered to the ATM network. This leads to the problem that the network topology among the exchanges 1501 existing on the network must be changed to one which is conscious of the ATM equipment 1601.

SUMMARY OF THE INVENTION

The present invention has been made with the background stated above, and it has for its object to incarnate a cell transmission network in which the network topology among exchanges as formed in a conventional TDM network can be exploited as it is, and in which the numbers of times of coding/decoding and cell assembling/disassembling operations for voice data match the numbers of times corresponding to one link of transmission equipment.

The first aspect of the present invention is premised on a cell transmission equipment (an ATM equipment 102) having a function of assembling communication data received from an exchange (101), into a cell (an ATM cell) of fixed length, and then transmitting the cell to a cell transmission network (an ATM network), a function of receiving communication data in the form of a cell, from the cell transmission network, and thereafter disassembling the cell and transmitting the resulting communication data to the exchange, and a function of determining a communication channel inside the equipment for use in connecting the equipment with the exchange, on the basis of data contained in a cell being processed within the equipment.

First, a passing-particular-equipment identification data insertion circuit (a frame generation unit 1014) inserts passing-particular-equipment identification data into the communication data to be transmitted to the exchange, the passing-particular-equipment identification data serving to identify whether or not the communication data is in a relaying state in which it is to be relayed by the particular equipment.

A passing-particular-equipment identification data reception circuit (a frame synchronization detection unit 1017) receives the passing-particular-equipment identification data from within the communication data received from the exchange.

A particular-communication-channel identification data insertion circuit (an MUX unit 1004) inserts particular-communication-channel identification data into the communication data to be transmitted to the exchange, the particular-communication-channel identification data indicating a communication channel of a cell correspondent to the communication data, when the received passing-particular-equipment identification data indicates the relaying state.

A particular-communication-channel identification data reception circuit (a particular-voice-channel identification data detection unit 1006) receives the particular-communication-channel identification data from within the communication data received from the exchange.

A cell route alteration circuit (a CLAD block 104 or an ATM cell switch block 105) alters the route of the cell inside the equipment, on the basis of the received particular-communication-channel identification data.

Owing to the above construction in the first aspect of the present invention, data processing units (for example, the CLAD blocks 104) opposing to each other can exchange the items of information on the communication channels of the cells which they are respectively processing, therebetween via the exchange. Therefore, the route of the cell inside the equipment is altered on the basis of the information, whereby the cell left intact can be relayed toward its destination without causing the communication data itself to pass through the exchange. As a result, the numbers of times of coding/decoding and cell assembling/disassembling operations for the voice data match the numbers of times corresponding to one link of transmission equipment.

In this case, the cell transmission equipment alters the relaying path of the cell on the basis of only the control of the particular equipment itself, and the exchange operates so as to receive the corresponding communication data from the data processing unit of the cell transmission equipment and to directly relay the received data to the opposing data processing unit included in the particular equipment, that is, the exchange executes the ordinary relaying operation. Therefore, the first aspect of the present invention has the feature that the network topology among the exchanges existing on the network need not be changed.

The second aspect of the present invention is premised on a cell transmission equipment (an ATM equipment 102) having a cell assembly/disassembly device (CLAD block 104) which assembles communication data received from an exchange (101), into a cell (an ATM cell) of fixed length, and then transmits the cell to a cell transmission network (an ATM network), and which receives communication data in the form of a cell, from the cell transmission network, and thereafter disassembles the cell and transmits the resulting communication data to the exchange, and a function of determining a communication channel inside the equipment for use in connecting the equipment with the exchange, on the basis of data contained in a cell being processed within the equipment.

In the first place, the second aspect of the present invention comprises a passing-particular-equipment identification data insertion circuit, a passing-particular-equipment identification data reception circuit, and a particular-communication-channel identification data reception circuit which are similar to those in the first aspect of the present invention.

Next, a particular-communication-channel identification data insertion circuit (an MUX unit 1004) inserts particular-communication-channel identification data into the communication data to be transmitted to the exchange, the particular-communication-channel identification data indicating the transmitting communication channel of the cell assembly/disassembly device (the transmission address value of the particular CLAD) which is processing a cell correspondent to the communication data, when the received passing-particular-equipment identification data indicates the relaying state.

A loop-back circuit (an SEL unit 1008) loops the cell received from the cell transmission network by the cell assembly/disassembly device, back to the side of the cell transmission network, when the passing-particular-equipment identification data which is contained in the cell assembly/disassembly device being processing the cell correspondent to the communication data received from the exchange and which has been received together with the communication data indicates the relaying state.

A cell route alteration circuit (an address/SEL control unit 1010, an address setting unit 1009) alters the route of the cell inside the equipment in the cell assembly/disassembly device, in such a way that the transmitting communication channel of the cell to be looped back is altered to one which is indicated by the particular-communication-channel identification data received from the exchange together with the communication data.

The third aspect of the present invention is premised on the same cell transmission equipment as in the second aspect of the present invention.

In the first place, the third aspect of the present invention comprises a passing-particular-equipment identification data insertion circuit, a passing-particular-equipment identification data reception circuit, a particular-communication-channel identification data reception circuit, and a loop-back circuit which are similar to those in the second aspect of the present invention.

Next, a particular-communication-channel identification data insertion circuit (an MUX unit 1004) inserts particular-communication-channel identification data into the communication data to be transmitted to the exchange, the particular-communication-channel identification data indicating a receiving communication channel of the cell assembly/disassembly device (the reception address value of the particular CLAD) which is processing the cell correspondent to the communication data, when the received passing-particular-equipment identification data indicates the relaying state.

Besides, a cell route alteration circuit (a selective reception unit 1002, an address/SEL control unit 1010) alters the route of the cell inside the equipment in the cell assembly/disassembly device, in such a way that the receiving communication channel of the cell to be received from the cell transmission network is altered to one which is indicated by the particular-communication-channel identification data received from the exchange together with the communication data.

Owing to the above construction in the second or third aspect of the present invention, the cell assembly/disassembly devices opposing to each other can exchange the items of information on the transmission and reception channels of the cells which they are respectively processing, therebetween via the exchange. Therefore, the cell received from the cell transmission network can be looped back to the cell transmission network and be relayed on the basis of the information, without executing the cell assembling/disassembling processing in each cell assembly/disassembly device. As a result, the numbers of times of coding/decoding and cell assembling/disassembling operations for the voice data match the numbers of times corresponding to one link of transmission equipment.

Also, likewise to the first aspect of the present invention, the second or third aspect thereof has the feature that the network topology among the exchanges existing on the network need not be changed.

The fourth aspect of the present invention is premised on a cell transmission equipment (an ATM equipment 102) having a function of assembling communication data received from an exchange (101), into a cell (an ATM cell) of fixed length, switching the cell, and thereafter transmitting the cell to a cell transmission network (an ATM network), a function of receiving communication data in the form of a cell, from the cell transmission network, switching the cell, and thereafter disassembling the cell and transmitting the resulting communication data to the exchange, and a function of determining a communication channel inside the equipment for use in connecting the equipment with the exchange, on the basis of data contained in a cell being processed within the equipment.

In the first place, the fourth aspect of the present invention comprises a passing-particular-equipment identification data insertion circuit, a passing-particular-equipment identification data reception circuit, a particular-communication-channel identification data insertion circuit, and a particular-communication-channel identification data reception circuit which are similar to those in the first aspect of the present invention.

In addition, a cell-switching-route alteration circuit (a routing control unit 1205) alters the switching route of the cell inside the equipment, on the basis of the received particular-communication-channel identification data.

Owing to the above construction in the fourth aspect of the present invention, data processing units (for example, the CLAD blocks 104) opposing to each other can exchange the items of information on the transmission and reception channels of the cells which they are respectively processing, therebetween via the exchange. Therefore, the switching route of the cell is altered in a cell switching circuit (an ATM cell switch block 105) on the basis of the information, whereby the cell can be directly relayed. As a result, the numbers of times of coding/decoding and cell assembling/disassembling operations for the voice data match the numbers of times corresponding to one link of transmission equipment.

Also, likewise to the first aspect of the present invention, the fourth aspect thereof has the feature that the network topology among the exchanges existing on the network need not be changed.

The fifth aspect of the present invention is premised on a cell transmission equipment (an ATM equipment 102) having a function of assembling communication data received from an exchange (101), into a cell (an ATM cell) of fixed length, and then transmitting the cell to a cell transmission network (an ATM network), a function of receiving communication data in the form of a cell, from the cell transmission network, and thereafter disassembling the cell and transmitting the resulting communication data to the exchange, and a function of determining a communication channel inside the equipment for use in connecting the equipment with the exchange, on the basis of peculiar device identification information for identifying each of data processing units included in the equipment.

In the first place, the fifth aspect of the present invention comprises a passing-particular-equipment identification data insertion circuit, a passing-particular-equipment identification data reception circuit, and a particular-communication-channel identification data reception circuit which are similar to those in the first aspect of the present invention.

Next, a particular-communication-channel identification data insertion circuit (an MUX unit 1004) inserts particular-communication-channel identification data into the communication data to be transmitted to the exchange, the particular-communication-channel identification data being the peculiar device identification information (the peculiar number value of the particular CLAD) for identifying the data processing unit (the CLAD block 104) in which the communication data to be transmitted or a cell correspondent to the communication data is processed, when the received passing-particular-equipment identification data indicates the relaying state.

Besides, a cell route alteration circuit (the CLAD block 104, an ATM cell switch block 105) alters the route of the cell inside the equipment, on the basis of the received particular-communication-channel identification data.

Owing to the above construction in the fifth aspect of the present invention, the data processing units (for example, the CLAD blocks 104) opposing to each other can exchange the items of peculiar device identification information for identifying the respective data processing units, therebetween via the exchange. Therefore, the route of the cell inside the equipment is altered on the basis of the information, whereby the cell left intact can be relayed toward its destination without causing the communication data itself to pass through the exchange. As a result, the numbers of times of coding/decoding and cell assembling/disassembling operations for the voice data match the numbers of times corresponding to one link of transmission equipment.

Also, likewise to the first aspect of the present invention, the fifth aspect thereof has the feature that the network topology among the exchanges existing on the network need not be changed.

The sixth aspect of the present invention is premised on a cell transmission equipment (an ATM equipment 102) having a function of assembling communication data received from an exchange (101), into a cell (an ATM cell) of fixed length, switching the cell, and thereafter transmitting the cell to a cell transmission network (an ATM network), a function of receiving communication data in the form of a cell, from the cell transmission network, switching the cell, and thereafter disassembling the cell and transmitting the resulting communication data to the exchange, and a function of determining a communication channel inside the equipment for use in connecting the equipment with the exchange, on the basis of data contained in a cell being processed within the equipment.

In the first place, the sixth aspect of the present invention comprises a passing-particular-equipment identification data insertion circuit, a passing-particular-equipment identification data reception circuit, a particular-communication-channel identification data insertion circuit, and a particular-communication-channel identification data reception circuit which are similar to those in the fifth aspect of the present invention.

In addition, a cell-switching-route alteration circuit (a routing control unit 1205) alters the switching route of the cell inside the equipment, on the basis of the received particular-communication-channel identification data.

Owing to the above construction in the sixth aspect of the present invention, the data processing units (for example, CLAD blocks 104) opposing to each other can exchange the items of peculiar device identification information for identifying the respective data processing units, therebetween via the exchange. Therefore, the switching route of the cell is altered in a cell switching circuit (an ATM cell switch block 105) on the basis of the information, whereby the cell can be directly relayed. As a result, the numbers of times of coding/decoding and cell assembling/disassembling operations for the voice data match the numbers of times corresponding to one link of transmission equipment.

Also, likewise to the first aspect of the present invention, the sixth aspect thereof has the feature that the network topology among the exchanges existing on the network need not be changed.

BRIEF DESCRIPTION OF THE DRAWINGS

Other objects or features of the present invention will be readily understood by one skilled in the art from the description of the preferred embodiments thereof when read in conjunction with the accompanying drawings wherein:

FIG. 8 is a diagram showing the architecture of the first preferred embodiment of the present invention (in the relaying state thereof);

FIG. 13 is a diagram showing the architecture of the fourth preferred embodiment of the present invention;

DESCRIPTION OF THE PREFERRED EMBODIMENTS

Now, the preferred embodiments of the present invention will be described in detail with reference to the drawings.
First Fundamental Architecture Applicable to the Respective Preferred Embodiments FIG. 5 is a diagram showing a first fundamental architecture which is applicable to the respective preferred embodiments of the present invention.

Figure 5:
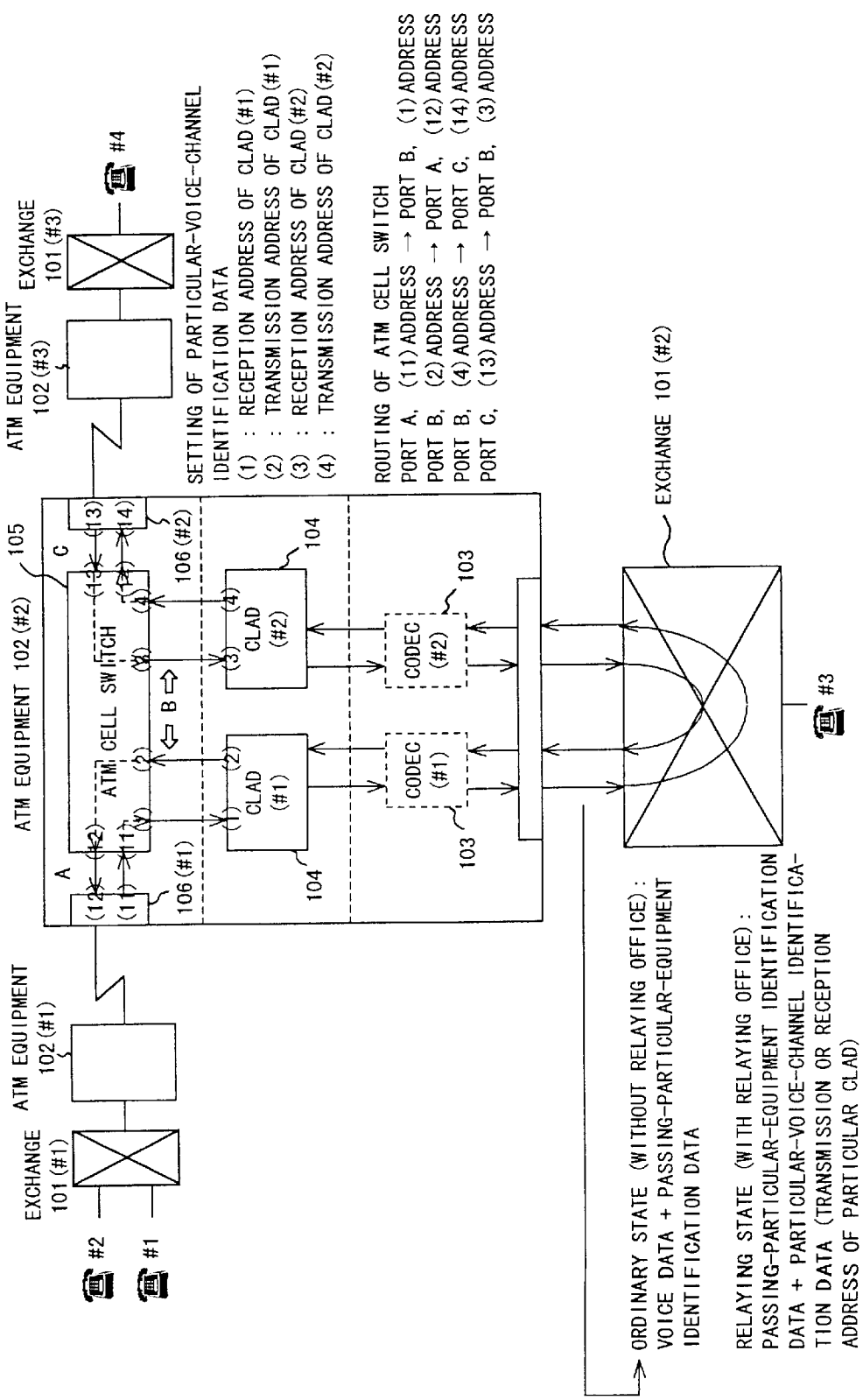
FIG. 5 is a diagram showing a first fundamental architecture which is applicable to the respective preferred embodiments of the present invention.

In the architecture illustrated in FIG. 5, ATM equipment 102 at #1–#3 function as relaying networks of respective exchanges 101 at #1–#3, and they form semifixed paths (permanent virtual channels) among the exchanges 101.

In this case, the transit trunks among the plurality of ATM equipment 102 are connected by an ATM dedicated line, an installation consisting of the exchange 101 and the ATM equipment 102 associated therewith is located in, for example, each branch office of an enterprise, and the ATM equipment 102 in the respective branch offices are connected by the ATM dedicated line, whereby a WAN (wide area network) can be formed. That is, each ATM equipment 102 can be caused to function as an ATM-WAN node which realizes WAN communications.

Also, when existing STM (synchronous transfer mode) private lines with which multiple access services etc. are utilizable are employed as the transit trunks, the ATM equipment 102 can be so constructed that ATM cells to be communicated among the ATM equipment 102 are transmitted using the time division channel or channels of one or more of the STM private lines as predetermined. Such an architecture makes it possible to merge ATM multiplexing technology which can flexibly cope with traffic fluctuations and which is suited for transmission of high efficiency, with TDM (time division multiplexing) technology which can reliably guarantee a high transmission line quality.

Here in this case, each ATM equipment 102 functioning as the ATM-WAN node can process voice data which the exchange 101 processes. Moreover, it can relay LAN traffic etc. exhibiting high degrees of burst, by connecting various sorts of TDM equipment or LAN equipment.

Regarding functions which are especially relevant to the present invention, the ATM equipment 102 includes a CODEC (coder/decoder) block 103 which codes and compresses original voice data inputted from the exchange 101 and then outputs the resulting data to the side of an ATM cell switch block 105, and which conversely decodes original voice data from coded voice data inputted from the side of the ATM cell switch block 105 and then outputs the resulting data to the exchange 101.

Also, the ATM equipment 102 includes a CLAD (cell assembly/disassembly) block 104 which assembles the coded voice data inputted from the CODEC block 103, into an ATM cell and then outputs the cell to the ATM cell switch block 105, and which conversely disassembles an ATM cell inputted from the ATM cell switch block 105, into the coded voice data.

Figure 1:
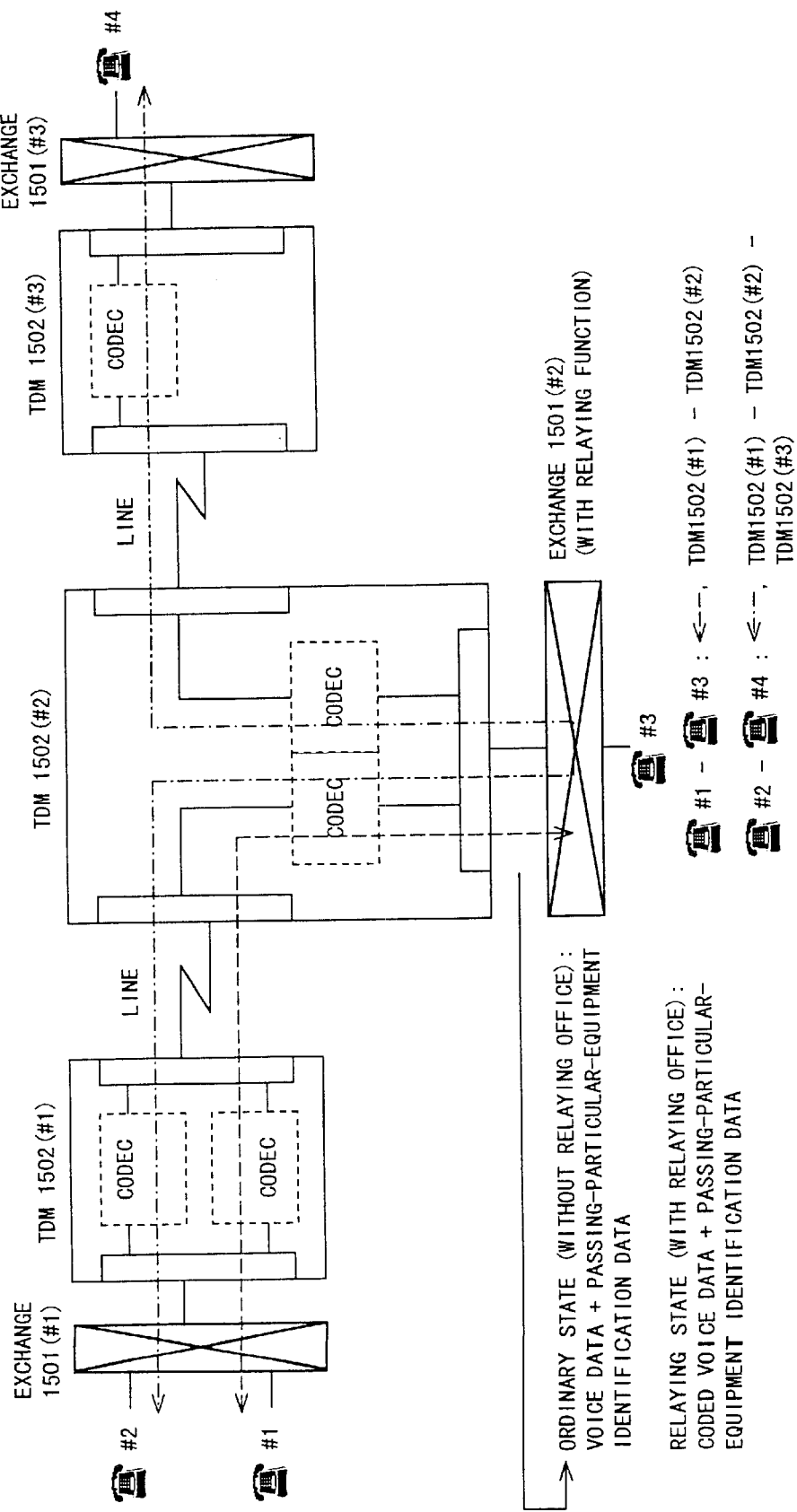
FIG. 1 is a diagram showing the architecture of a prior-art, voice data relaying system which employs TDM equipment.
Figure 2:
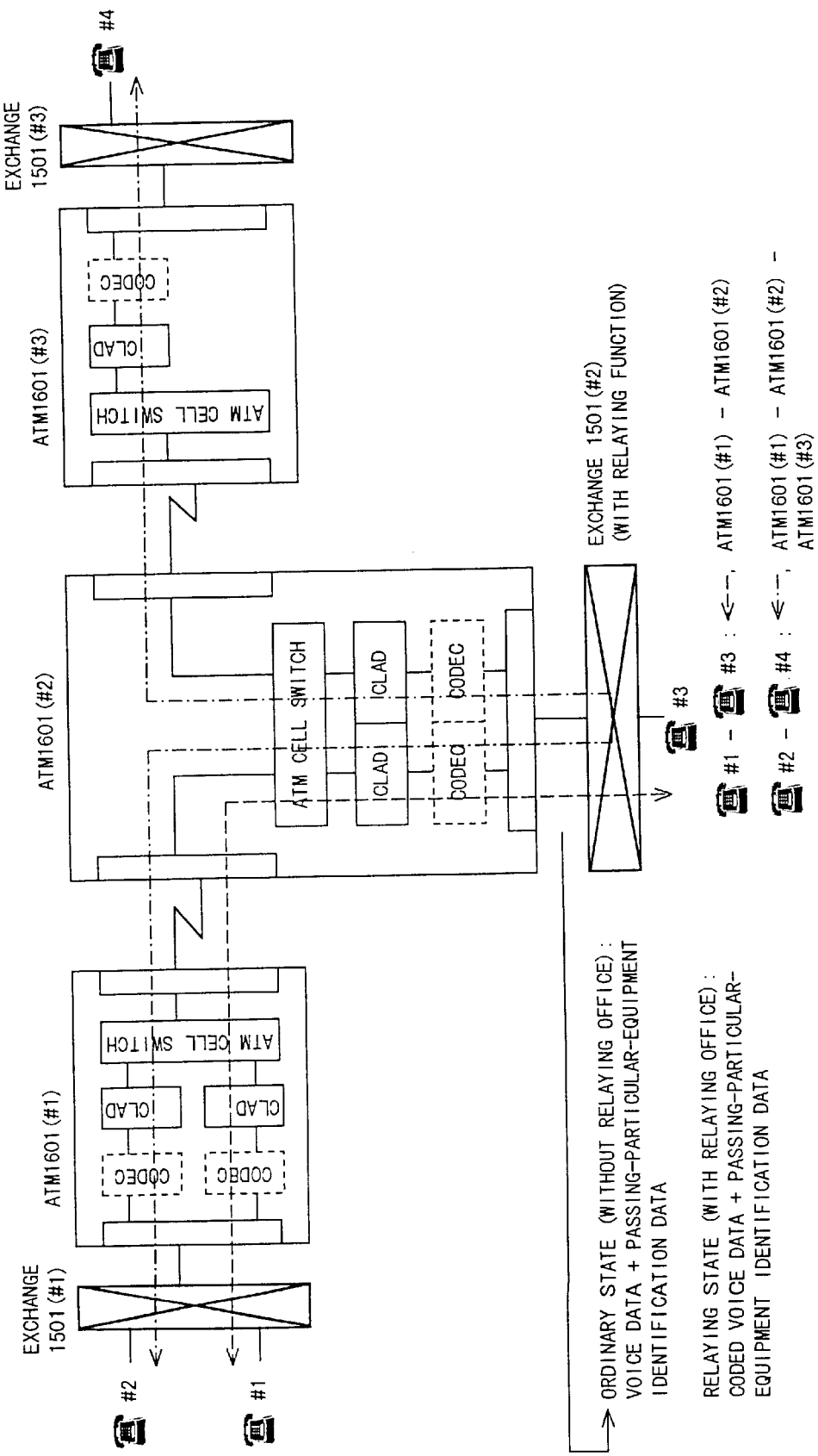
FIG. 2 is a diagram showing the architecture of a prior-art, voice data relaying system which employs ATM equipment (and in which TDM technology is applied as it is)
Figure 3:
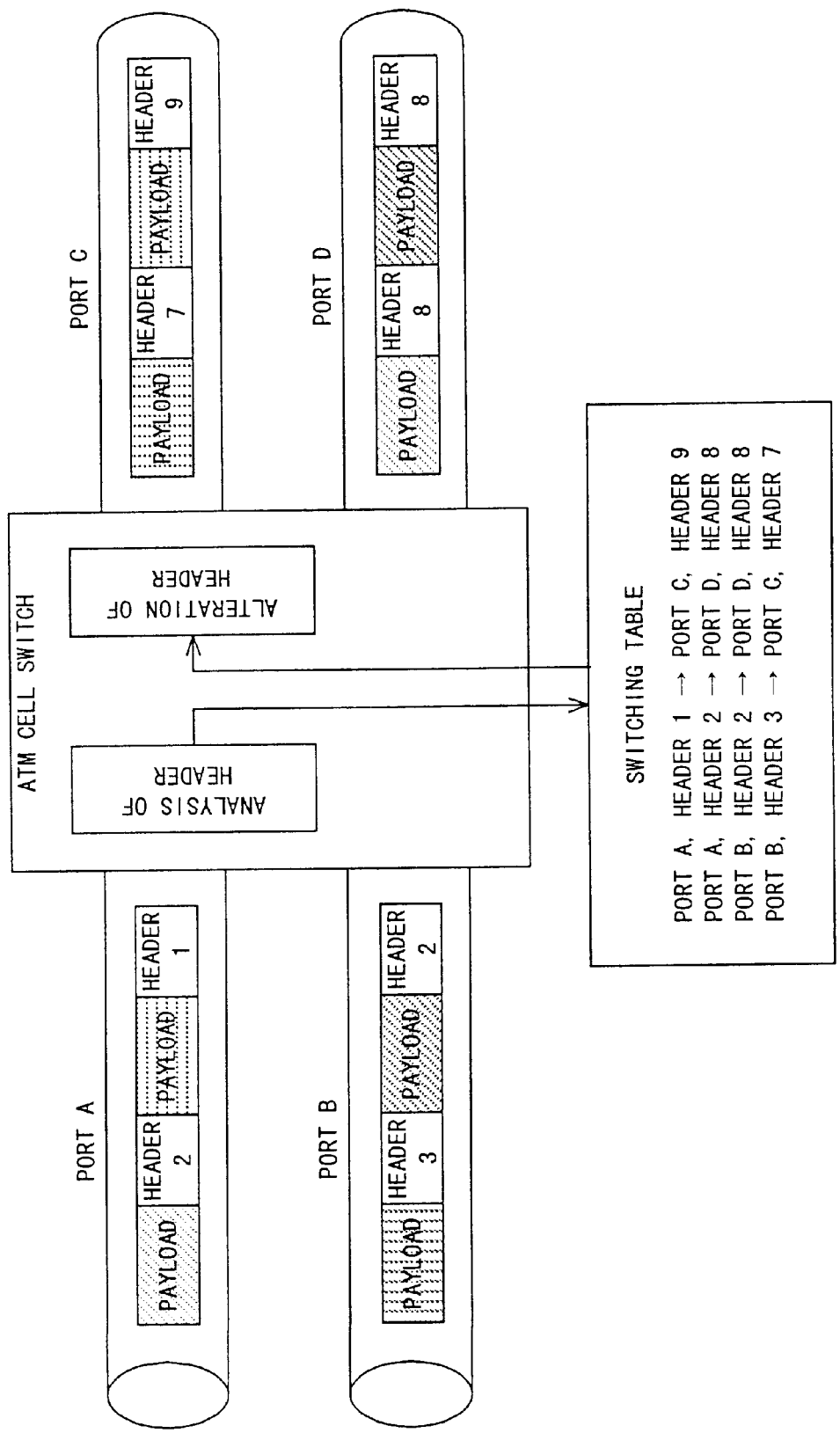
FIG. 3 is a diagram for explaining the principle of ATM switching.
Figure 4:
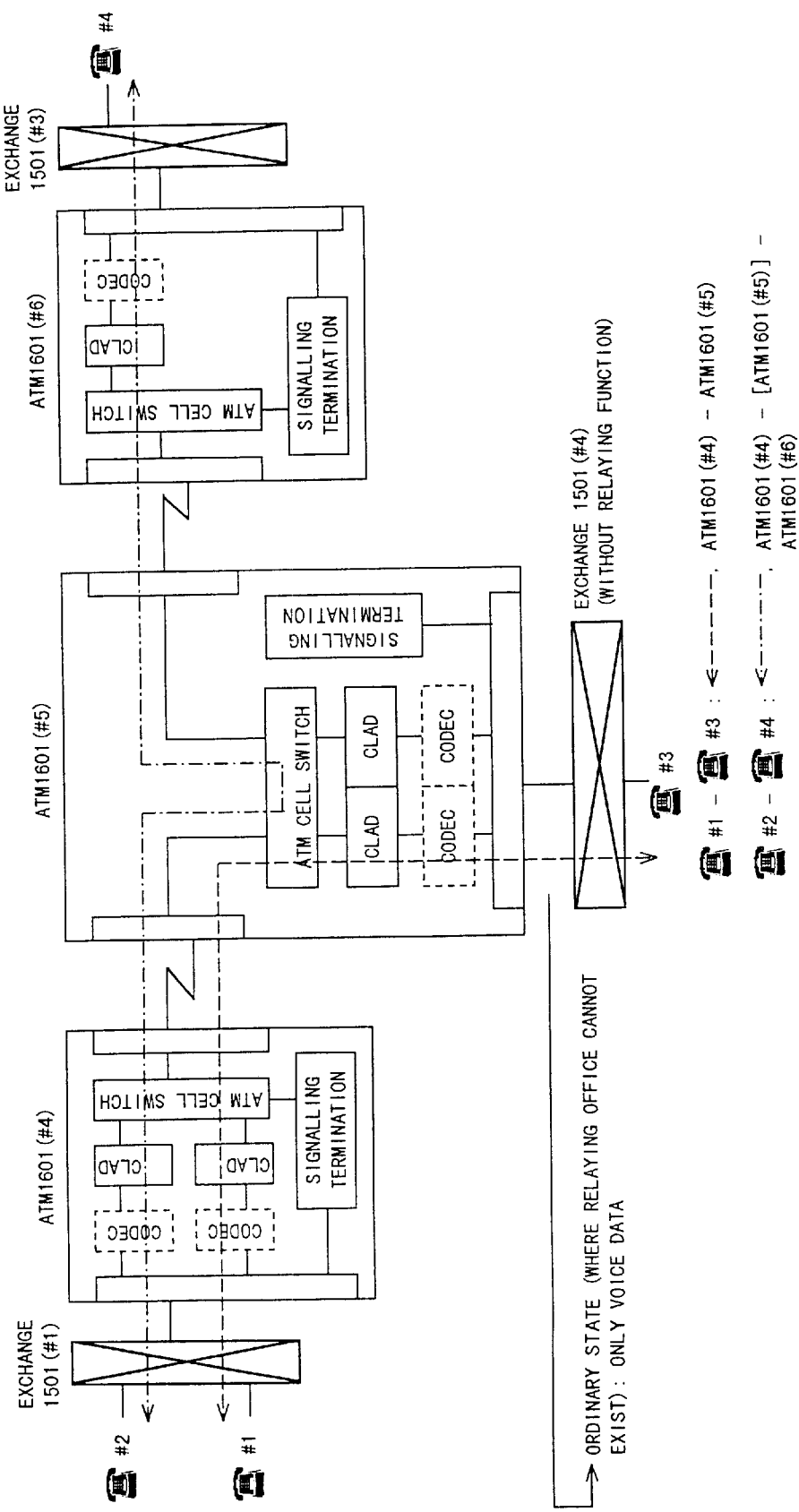
FIG. 4 is a diagram showing the architecture of a prior-art, voice data relaying system which employs ATM equipment (and in which signalling termination is introduced)

The ATM cell switch block 105 which is further included in the ATM equipment 102, executes the same switching process as explained with reference to FIG. 3 before, for an ATM cell which is communicated between this ATM equipment 102 and the exchange 101 or ATM equipment 102 connected in adjacency thereto.

Besides, the ATM equipment 102 includes a transmission line block 106 (a transmission line termination device) which terminates the ATM line connecting this ATM equipment 102 with the adjacent ATM equipment 102.

Here, the blocks 103–106 included in the ATM equipment 102 realize the autonomous routing (self-routing) of an ATM cell inside the ATM equipment 102, on the basis of destination information called VPI/VCI (a virtual path identifier/a virtual channel identifier) which is set in the header part of the ATM cell.

In, for example, the ATM equipment 102(#2), a certain ATM cell which has been transferred from the adjacent ATM equipment 102(#1) has a VPI/VCI value set in its header part, the VPI/VCI value corresponding to a transmission address (11) previously set for the line block 106(#1) connected to a port A, and this ATM cell is delivered from the line block 106(#1) to the port A of the ATM cell switch block 105.

Upon judging that the header part of the ATM cell received at the port A bears the VPI/VCI value corresponding to the transmission address (11) of the line block 106(#1), the ATM cell switch block 105 rewrites the VPI/VCI value of the header part of the ATM cell, into a value corresponding to the reception address (1) of the CLAD block 104(#1) connected to a port B, on the basis of previous setting. Thereafter, the resulting ATM cell is transferred into the ATM cell switch block 105.

The ATM cell switch block 105 autonomously routes the above ATM cell so as to be transferred to the port B, on the basis of the port number information of the port A and the VPI/VCI value contained in the header part of the ATM cell.

The CLAD block 104(#1) connected to the port B accepts thereinto the ATM cell received from the ATM cell switch block 105 only in a case where it has judged that the header part of this ATM cell bears the VPI/VCI value corresponding to the reception address (1) set for the particular device 104(#1) beforehand.

Likewise, in the ATM equipment 102(#2), a certain ATM cell which has been transferred from the adjacent ATM equipment 102(#3) has a VPI/VCI value set in its header part, the VPI/VCI value corresponding to a transmission address (13) previously set for the line block 106(#2) connected to a port C, and this ATM cell is delivered from the line block 106(#2) to the port C of the ATM cell switch block 105.

Upon judging that the header part of the ATM cell received at the port C bears the VPI/VCI value corresponding to the transmission address (13) of the line block 106(#2), the ATM cell switch block 105 rewrites the VPI/VCI value of the header part of the ATM cell, into a value corresponding to the reception address (3) of the CLAD block 104(#2) connected to the port B, on the basis of previous setting. Thereafter, the resulting ATM cell is transferred into the ATM cell switch block 105.

The ATM cell switch block 105 autonomously routes the above ATM cell so as to be transferred to the port B, on the basis of the port number information of the port C and the VPI/VCI value affixed to the header part of the ATM cell.

The CLAD block 104(#2) connected to the port B accepts thereinto the ATM cell received from the ATM cell switch block 105 only in a case where it has judged that the header part of this ATM cell bears the VPI/VCI value corresponding to the reception address (3) set for the particular device 104(#2) beforehand.

On the other hand, in the ATM equipment 102(#2), an ATM cell to be delivered from the CLAD block 104(#1) has a VPI/VCI value set in its header part, the VPI/VCI value corresponding to a transmission address (2) previously set for the particular device 104(#1), and this ATM cell is delivered from the CLAD block 104(#1) to the port B of the ATM cell switch block 105.

Upon judging that the header part of the ATM cell received at the port B bears the VPI/VCI value corresponding to the transmission address (2) of the CLAD block 104(#1), the ATM cell switch block 105 rewrites the VPI/VCI value of the header part of the ATM cell, into a value corresponding to the reception address (12) of the line block 106(#1) connected to the port A, on the basis of previous setting. Thereafter, the resulting ATM cell is transferred into the ATM cell switch block 105.

The ATM cell switch block 105 autonomously routes the above ATM cell so as to be transferred to the port A, on the basis of the port number information of the port B and the VPI/VCI value affixed to the header part of the ATM cell.

The line block 106(#1) connected to the port A accepts thereinto the ATM cell received from the ATM cell switch block 105 only in a case where it has judged that the header part of this ATM cell bears the VPI/VCI value corresponding to the reception address (12) set for the particular device 106(#1) beforehand. Subsequently, the line block 106(#1) delivers the accepted ATM cell to the ATM line with which the adjacent ATM equipment 102(#1) is connected.

Likewise, in the ATM equipment 102(#2), an ATM cell to be delivered from the CLAD block 104(#2) has a VPI/VCI value set in its header part, the VPI/VCI value corresponding to a transmission address (4) previously set for the particular device 104(#2), and this ATM cell is delivered from the CLAD block 104(#2) to the port B of the ATM cell switch block 105.

Upon judging that the header part of the ATM cell received at the port B bears the VPI/VCI value corresponding to the transmission address (4) of the CLAD block 104(#2), the ATM cell switch block 105 rewrites the VPI/VCI value of the header part of the ATM cell, into a value corresponding to the reception address (14) of the line block 106(#2) connected to the port C, on the basis of previous setting. Thereafter, the resulting ATM cell is transferred into the ATM cell switch block 105.

The ATM cell switch block 105 autonomously routes the above ATM cell so as to be transferred to the port C, on the basis of the port number information of the port B and the VPI/VCI value affixed to the header part of the ATM cell.

The line block 106(#2) connected to the port C accepts thereinto the ATM cell received from the ATM cell switch block 105 only in a case where it has judged that the header part of this ATM cell bears the VPI/VCI value corresponding to the reception address (14) set for the particular device 106(#2) beforehand. Subsequently, the line block 106(#2) delivers the accepted ATM cell to the ATM line with which the adjacent ATM equipment 102(#3) is connected.

In the above way, in the ATM equipment 102(#2), the following four semifixed paths (permanent virtual paths) are formed:

Path 1
Port A, Transmission address (11) of Line block 106(#1) →Port B, Reception address (1) of CLAD block 104 (#1)

Path 2
Port B, Transmission address (2) of CLAD block 104(#1) →Port A, Reception address (12) of Line block 106(#1)

Path 3
Port B, Transmission address (4) of CLAD block 104(#2) →Port C, Reception address (14) of Line block 106(#2)

Path 4
Port C, Transmission address (13) of Line block 106(#2) →Port B, Reception address (3) of CLAD block 104 (#2)

Now, by way of example, in a case where voice is to be sent from a telephone set #1 connected to the exchange 101(#1), to a telephone set #3 connected to the exchange 101(#2), the ATM equipment 102(#2) transfers an ATM cell correspondent to the voice by the use of the above path 1. Besides, the CLAD block 104(#1) included in the ATM equipment 102(#2) converts the ATM cell into coded voice data on the first time-division channel. Further, the CODEC block 103(#1) included in the ATM equipment 102(#2) restores original voice data from the coded voice data of the first time-division channel. The original voice data is transferred to the exchange 101(#2) by the use of the first time-division channel until it arrives at the telephone set #3.

To the contrary, in a case where voice is to be sent from the telephone set #3 connected to the exchange 101(#2), to the telephone set #1 connected to the exchange 101(#1), the ATM equipment 102(#2) transfers an ATM cell correspondent to the voice by the use of the above path 2. In this case, the CODEC block 103(#1) included in the ATM equipment 102(#2) codes and compresses original voice data received from the second time-division channel which pairs with and extends reversely to the first time-division channel. Further, the CLAD block 104(#1) included in the ATM equipment 102(#2) converts the coded voice data into an ATM cell. The ATM cell is transferred from the ATM cell switch block 105 included in the ATM equipment 102(#2), to the ATM equipment 102(#1) via the line block 106(#1), and it is converted into the coded voice data of a predetermined time-division channel by the CLAD block which is included in the ATM equipment 102(#1) and which is not especially shown. Besides, the CODEC block which is included in the ATM equipment 102(#1) and which is not especially shown restores original voice data from the coded voice data of the above time-division channel. The original voice data is transferred to the exchange 101(#1) by the use of the above time-division channel until it arrives at the telephone set #1.

Also in a case where telephonic communications are to be established between a telephone set #4 connected to the exchange 101(#3) and the telephone set #3 connected to the exchange 101(#2), the ATM equipment 102(#2) executes transfer processing similar to the above, by the use of the CLAD block 104(#2) and CODEC block 103(#2) which are included in this equipment 102(#2).

Next, there will be described a case where telephonic communications are to be established between the telephone set #1 connected to the exchange 101(#1) and the telephone set #4 connected to the exchange 101(#3).

In this case, voice data is transferred along the path of Telephone set #1←-→Exchange 101(#1)←-→ATM equipment 102(#1)←-→ATM equipment 102(#2)←-→ATM equipment 102(#3)←-→Exchange 101(#3)←-→Telephone set #4.

More specifically, it is a feature relevant to the present invention that, in each of the preferred embodiments of the present invention, the ATM equipment 102(#2) alters a path inside the particular equipment 102(#2) so as to relay the voice data in the form of an ATM cell left intact, in lieu of the exchange 101(#2).

As a result, the ATM equipment 102(#2) is permitted to relay the voice data in the form of the ATM cell as it is, by executing neither the cell assembling/disassembling operation nor the coding/decoding operation, and the digital one-link relaying of voice is realized.

In this case, the ATM equipment 102(#2) alters the relaying path on the basis of only the control of the particular equipment itself. The exchange 101(#2) operates so as to receive data on a corresponding time-division channel from the first CODEC block 103 included in the ATM equipment 102(#2), and to directly relay the data to the opposing second CODEC block 103 included in the particular equipment 102(#2). That is, the exchange 101(#2) executes the ordinary relaying operation. This brings forth the feature that the network topology among the exchanges 101 existing on the network need not be changed.

Here, in a case where such a relaying operation has become necessary, the two CODEC blocks 103 in the ATM equipment 102(#2) mutually exchange items of information on the transmission/reception addresses of ATM cells in the respective CODEC blocks 103, unlike the voice data, by utilizing the time division channels which are connected via the exchange 101(#2). On the basis of the information exchange, the relaying paths are altered in the ATM cell switch block 105 or two CODEC blocks 103 included in the ATM equipment 102(#2). This is the great feature relevant to the present invention.

In order to realize the relaying control, in a case where the first CLAD block 104 included in the ATM equipment 102(#2) or the first CODEC block 103 connected thereto is to deliver the voice data toward the exchange 101(#2) on the first time-division channel, it superposes passing-particular-equipment identification data on voice data on the basis of previous call setting, the identification data serving to identify whether or not the voice data is to be relayed by the ATM equipment 102(#2) to which the particular device 104 or 103 belongs.

After having been delivered from the first CLAD block 104 or first CODEC block 103 included in the ATM equipment 102(#2), the passing-particular-equipment identification data is relayed by the exchange 101(#2) and is received by the second CLAD block 104 located on the opposite side to the first CLAD block 104 within the ATM equipment 102(#2) or by the second CODEC block 103 connected thereto.

Besides, when the passing-particular-equipment identification data superposed on the received voice data has been judged as indicating that the voice data on the first time-division channel along which the identification data has been transmitted in is to be relayed by the particular ATM equipment 102(#2), the second CODEC block 103 stops the coding/decoding operation.

Also, using the second time-division channel which pairs with and extends reversely to the first time-division channel mentioned above, the second CLAD block 104 or the second CODEC block 103 delivers passing-particular-equipment identification data which indicates that voice data on the second time-division channel is to be similarly relayed by the particular ATM equipment 102(#2).

Simultaneously, using the second time-division channel mentioned above, the second CLAD block 104 delivers a transmission address or reception address set for the particular device 104 beforehand, as particular-voice-channel identification data.

The above passing-particular-equipment identification data and particular-voice-channel identification data on the second time-division channel are relayed by the exchange 101(#2), and are transferred to the first CLAD block 104 or first CODEC block 103 which is included in the ATM equipment 102(#2).

When the passing-particular-equipment identification data on the second time-division channel has been first received, the first CODEC block 103 stops the coding/decoding operation.

Subsequently, the particular-voice-channel identification data on the second time-division channel passes through the first CODEC block 103 having stopped the coding/decoding operation and is received by the first CLAD block 104.

Besides, using the first time-division channel mentioned above, the first CLAD block 104 delivers a transmission address or reception address set for the particular device 104 beforehand, as particular-voive-channel identification data.

The particular-voice-channel identification data on the first time-division channel passes through the first CODEC block 103 having stopped the coding/decoding operation, it is thereafter relayed by the exchange 101(#2), it further passes through the second CODEC block 103 having stopped the coding/decoding operation, and it is received by the second CLAD block 104 included in the ATM equipment 102(#2).

In the above way, in the case where the voice data on the first time-division channel and the voice data on the second time-division channel pairing with and extending reversely to the first time-division channel are to be relayed by the ATM equipment 102(#2), the two CLAD blocks 104(#1 and #2) in the ATM equipment 102(#2) mutually exchange the particular-voice-channel identification data being the items of information on the transmission/reception addresses of the ATM cells in the respective CODEC blocks 103, unlike the voice data, by utilizing the first and second time-division channels which are connected via the exchange 101(#2).

Herein, on the basis of the particular-voice-channel identification data, the two CODEC blocks 103(#1 and #2) or the ATM cell switch block 105 which are/is included in the ATM equipment 102(#2) alter/alters the relaying paths so that the respective ATM cells corresponding to the first and second time-division channels may be directly transferred along the route of ATM equipment 102(#1)←—→ATM equipment 102(#2)←—→ATM equipment 102(#3).

Practicable alteration controls for the switching paths will be described later as to the first—third preferred embodiments.

Figure 6:
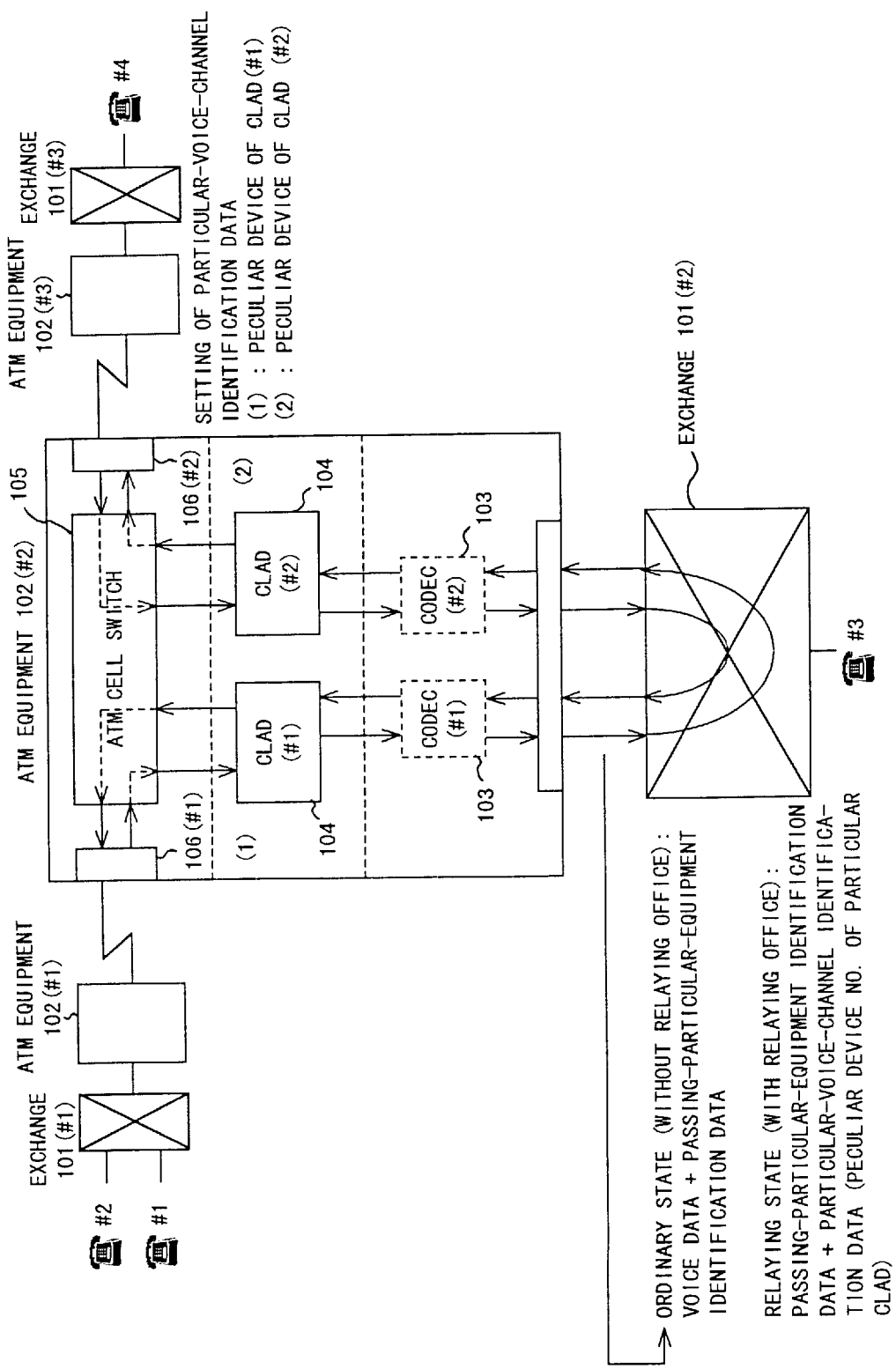
FIG. 6 is a diagram showing a second fundamental architecture which is applicable to the respective preferred embodiments of the present invention.

Second Fundamental Architecture Applicable to the Respective Preferred Embodiments FIG. 6 is a diagram showing a second fundamental architecture which is applicable to the respective preferred embodiments of the present invention.

The point of difference of the architecture in FIG. 6 from the architecture in FIG. 5 is that, in the foregoing case where the voice data on the first time-division channel and the voice data on the second time-division channel pairing with and extending reversely to the first time-division channel are to be relayed by the ATM equipment 102(#2), the two CLAD blocks 104(#1 and #2) in the ATM equipment 102(#2) mutually exchange peculiar device numbers previously set for the respective CODEC blocks 103, as the particular-voice-channel identification data replacing the items of information on the transmission/reception addresses of the ATM cells in the respective CODEC blocks 103, by utilizing the first and second time-division channels which are connected via the exchange 101(#2).

The peculiar device numbers are bestowed on the CLAD blocks 104, and are exchanged as the particular-voice-channel identification data. Thus, it is permitted to identify the ATM cells to-be-relayed which are delivered and accepted between the ATM cell switch block 105 and the respective CLAD blocks 104, and to alter the relaying paths in the same way as in the case of the first fundamental architecture shown in FIG. 5.

First Preferred Embodiment of the Present Invention

Figure 7:
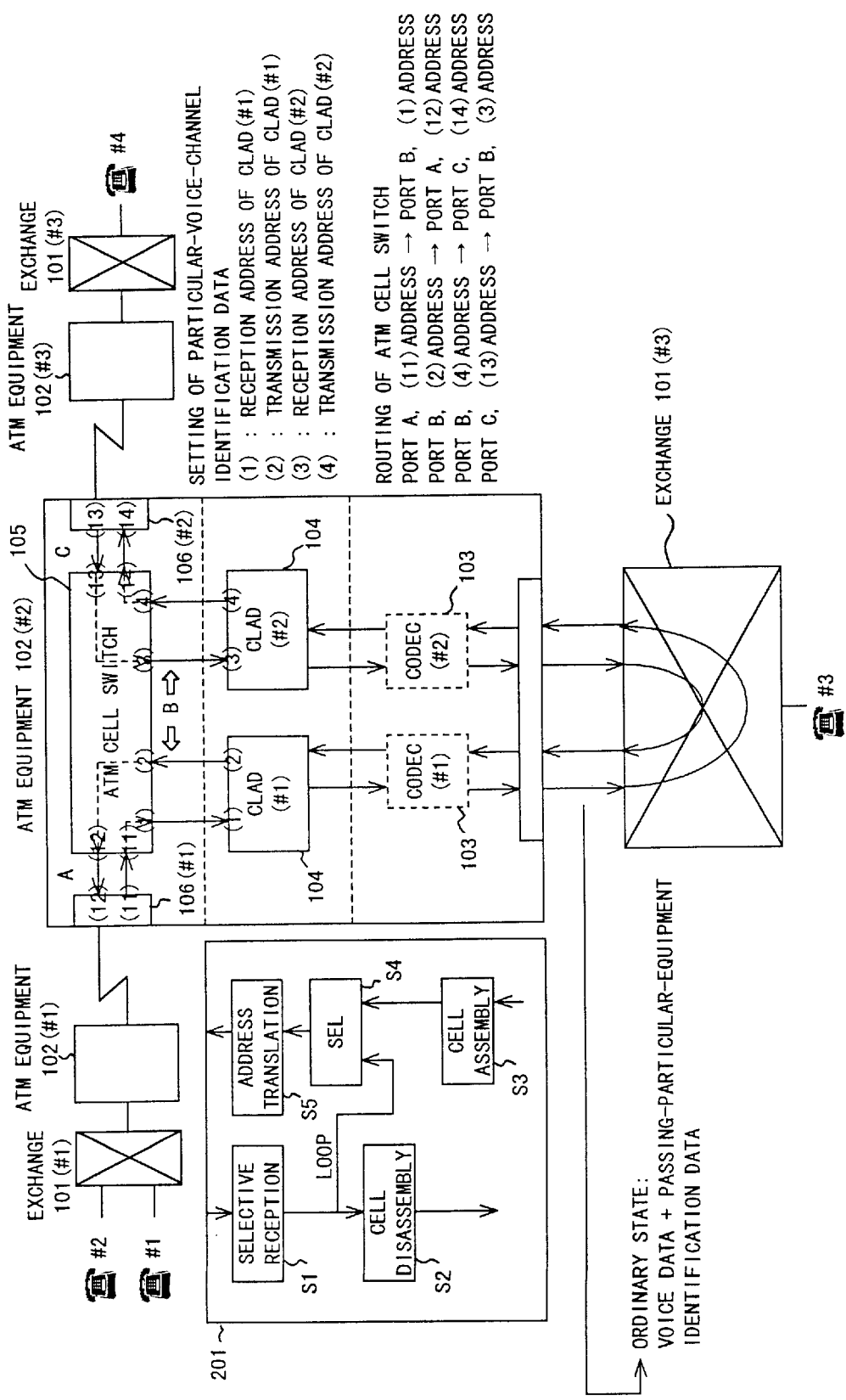
FIG. 7 is a diagram showing the architecture of the first preferred embodiment of the present invention (in the ordinary state thereof)

FIGS. 7 and 8 are diagrams showing the construction of the first preferred embodiment of the present invention as based on the first fundamental architecture depicted in FIG. 5.

First, FIG. 7 illustrates an ordinary state being a control state correspondent to the path as to which the ATM equipment 102(#2) does not perform the relaying operation.

The ordinary state corresponds to, for example, the state of the ATM equipment 102(#2) in the case where telephonic communications are held between the telephone set #1 connected to the exchange 101(#1) and the telephone set #3 connected to the exchange 101(#2).

As stated before with reference to FIG. 5, in the case where voice is sent from the telephone set #1 connected to the exchange 101(#1), to the telephone set #3 connected to the exchange 101(#2), an ATM cell corresponding to the voice is received by the transmission line block 106(#1) included in the ATM equipment 102(#2), via the ATM equipment 102(#1). Thereafter, using the path 1 stated in conjunction with FIG. 5, the ATM cell is transferred to the CLAD block 104(#1) included in the ATM equipment 102(#2), via the ATM cell switch block 105 included therein.

Subsequently, the CLAD block 104(#1) selectively receives the above ATM cell (step S1 indicated within a square 201 in FIG. 7), followed by the conversion of the ATM cell into coded voice data on the first time-division channel (cell disassembly at a step S2 indicated within the square 201 in FIG. 7).

Further, the CODEC block 103(#1) included in the ATM equipment 102(#2) restores original voice data from the coded voice data on the first time-division channel.

Using the first time-division channel, the original voice data is transferred to the exchange 101(#2) and arrives at the telephone set #3.

To the contrary, in the case where voice is sent from the telephone set #3 connected to the exchange 101(#2), to the telephone set #1 connected to the exchange 101(#1), the CODEC block 103(#1) included in the ATM equipment 102(#2) accepts original voice data transmitted by the telephone set #3, from the exchange 101(#2), by the use of the second predetermined time-division channel pairing with and extending reversely to the above first time-division channel, and it codes and compresses the accepted original voice data.

Subsequently, the CLAD block 104(#1) included in the ATM equipment 102(#2) converts the coded voice data into an ATM cell (step S3 indicated within the square 201 in FIG. 7). The ATM cell has a VPI/VCI value affixed to its header part, the VPI/VCI value corresponding to the transmission address (2) of the CLAD block 104(#1). The resulting ATM cell is outputted from the CLAD block 104(#1) to the ATM cell switch block 105 included in the ATM equipment 102(#2) (steps S4→S5 indicated within the square 201 in FIG. 7).

The ATM cell is further transferred from the ATM cell switch block 105 to the ATM equipment 102(#1) via the line block 106(#1), and it is converted into the coded voice data of a predetermined time-division channel by the CLAD block which is included in the equipment 102(#1) and which is not especially shown.

Besides, the CODEC block which is included in the ATM equipment 102(#1) and which is not especially shown restores the original voice data from the coded voice data of the time-division channel. Using this time-division channel, the original voice data is transferred to the exchange 101(#1) and arrives at the telephone set #1.

Also in the ordinary state in which telephonic communications are held between the telephone set #4 connected to the exchange 101(#3) and the telephone set #3 connected to the exchange 101(#2), the ATM equipment 102(#2) executes transfer processing similar to the above, by the use of the CLAD block 104(#2) and CODEC block 103(#2) which are included in this equipment 102(#2).

Next, FIG. 8 illustrates a relaying state being a control state correspondent to the path as to which the ATM equipment 102(#2) performs the relaying operation.

The relaying state corresponds to, for example, the state of the ATM equipment 102(#2) in the case where telephonic communications are held between the telephone set #1 connected to the exchange 101(#1) and the telephone set #4 connected to the exchange 101(#3).

In the case where the ATM equipment 102(#2) has fallen into the state in which voice data on the first time-division channel and voice data on the second time-division channel pairing with and extending reversely to the first time-division channel are to be relayed by this ATM equipment 102(#2), the processing explained before with reference to FIG. 5 is executed. More specifically, the first CLAD block 104 included in the ATM equipment 102(#2) or the first CODEC block 103 connected to the block 104 as has detected the relaying state superposes passing-particular-equipment identification data on the voice data, the identification data indicating that the voice data is to be relayed by the ATM equipment 102(#2) to which the particular device 104 or 103 belongs, at the time of sending the voice data toward the exchange 101(#2) on the first time-division channel.

By the way, in the ordinary state illustrated in FIG. 7, the voice data on the time division channel bears superposed passing-particular-equipment identification data which indicates that the voice data is not to be relayed by the ATM equipment 102(#2) to which the particular device 104 or 103 belongs.

As explained before with reference to FIG. 5, after the items of passing-particular-equipment identification data have been successively detected by the two CODEC blocks 103 or two CLAD blocks 104 included in the ATM equipment 102(#2), the two CODEC blocks 103 included in the ATM equipment 102(#2) stop the coding/decoding operations.

Simultaneously, as explained before with reference to FIG. 5, the two CLAD blocks 104 included in the ATM equipment 102(#2) mutually exchange the particular-voice-channel identification data being the items of information on the transmission addresses of the ATM cells in the respective CODEC blocks 103, unlike the voice data, by utilizing the first and second time-division channels which are connected via the exchange 101(#2).

In the example of FIG. 8, the CLAD block 104(#1) notifies the transmission address (2) of the ATM cell lying in the particular device 104(#1), to the CLAD block 104(#2) by utilizing the first time-division channel which is connected with the CLAD block 104(#2) via the exchange 101(#2).

On the other hand, also the CLAD block 104(#2) notifies the transmission address (4) of the ATM cell lying in the particular device 104(#2), to the CLAD block 104(#1) by utilizing the second time-division channel which is connected with the CLAD block 104(#1) via the exchange 101(#2).

When, after the reception of the transmission address (4) from the CLAD block 104(#2), the CLAD block 104(#1) has received an ATM cell whose header part bears a VPI/VCI value corresponding to the reception address (1), via the ATM cell switch block 105 from the transmission line block 106(#1), it loops the received ATM cell back to a route for delivering this cell to the ATM cell switch block 105, without disassembling this cell (LOOP at steps S1→S4 indicated within the square 201 in FIG. 7).

Simultaneously, the CLAD block 104(#1) alters the VPI/VCI value which is set in the header part of the ATM cell turned back in the above way, from a value correspondent to the transmission address (2) to a value correspondent to the transmission address (4), and it sends the resulting ATM cell toward the ATM cell switch block 105 (steps S4→S5 indicated within the square 201 in FIG. 7).

On the other hand, when, after the reception of the transmission address (2) from the CLAD block 104(#1), the CLAD block 104(#2) has received an ATM cell whose header part bears a VPI/VCI value corresponding to the reception address (3), via the ATM cell switch block 105 from the transmission line block 106(#2), it loops the received ATM cell back to a route for delivering this cell to the ATM cell switch block 105.

Simultaneously, the CLAD block 104(#2) alters the VPI/VCI value which is set in the header part of the ATM cell turned back in the above way, from a value correspondent to the transmission address (4) to a value correspondent to the transmission address (2), and it sends the resulting ATM cell toward the ATM cell switch block 105.

As explained before with reference to FIG. 5, when the ATM cell switch block 105 has judged that the header part of the ATM cell received at the port B bears the VPI/VCI value corresponding to the transmission address (4), it rewrites the VPI/VCI value of the header part of the ATM cell, into a value corresponding to the reception address (14) of the line block 106(#2) connected to the port C, on the basis of previous setting. Thereafter, the resulting ATM cell is transferred into the ATM cell switch block 105. Besides, the ATM cell switch block 105 autonomously routes the above ATM cell so as to be transferred to the port C, on the basis of the port number information of the port B and the VPI/VCI value affixed to the header part of the ATM cell.

As also explained before with reference to FIG. 5, when the ATM cell switch block 105 has judged that the header part of the ATM cell received at the port B bears the VPI/VCI value corresponding to the transmission address (2), it rewrites the VPI/VCI value of the header part of the ATM cell, into a value corresponding to the reception address (12) of the line block 106(#1) connected to the port A, on the basis of previous setting. Thereafter, the resulting ATM cell is transferred into the ATM cell switch block 105. Besides, the ATM cell switch block 105 autonomously routes the above ATM cell so as to be transferred to the port A, on the basis of the port number information of the port B and the VPI/VCI value affixed to the header part of the ATM cell.

As the result of the above control operation, the ATM cell which contains the voice data directed to the exchange 101(#3) and which has been received from the ATM equipment 102(#1) by the line block 106(#1) included in the ATM equipment 102(#2) is received by the CLAD block 104(#1) included in the ATM equipment 102(#2), via the ATM cell switch block 105 included therein, and it is turned back in the CLAD block 104(#1). Further, the ATM cell is directly transferred to the line block 106(#2) included in the ATM equipment 102(#2), via the ATM cell switch block 105 included therein, and it is transmitted from the line block 106(#2) toward the ATM equipment 102(#3).

To the contrary, the ATM cell which contains the voice data directed to the exchange 101(#1) and which has been received from the ATM equipment 102(#3) by the line block 106(#2) included in the ATM equipment 102(#2) is received by the CLAD block 104(#2) included in the ATM equipment 102(#2), via the ATM cell switch block 105 included therein, and it is turned back in the CLAD block 104(#2). Further, the ATM cell is directly transferred to the line block 106(#1) included in the ATM equipment 102(#2), via the ATM cell switch block 105 included therein, and it is transmitted from the line block 106(#1) toward the ATM equipment 102(#1).

As a result, the ATM equipment 102(#2) is permitted to relay the voice data in the form of the ATM cell as it is, by executing neither the cell assembling/disassembling operation nor the coding/decoding operation, and the digital one-link relaying of voice is realized.

In this case, as explained before with reference to FIG. 5, the exchange 101(#2) executes the ordinary relaying operation so that the data on the first or second time-division channel may be communicated between the first and second CODEC blocks 103 which are included in the ATM equipment 102(#2). This preferred embodiment therefore has the feature that the network topology among the exchanges 101 existing on the network need not be changed.

Second Preferred Embodiment of the Present Invention

Figure 9:
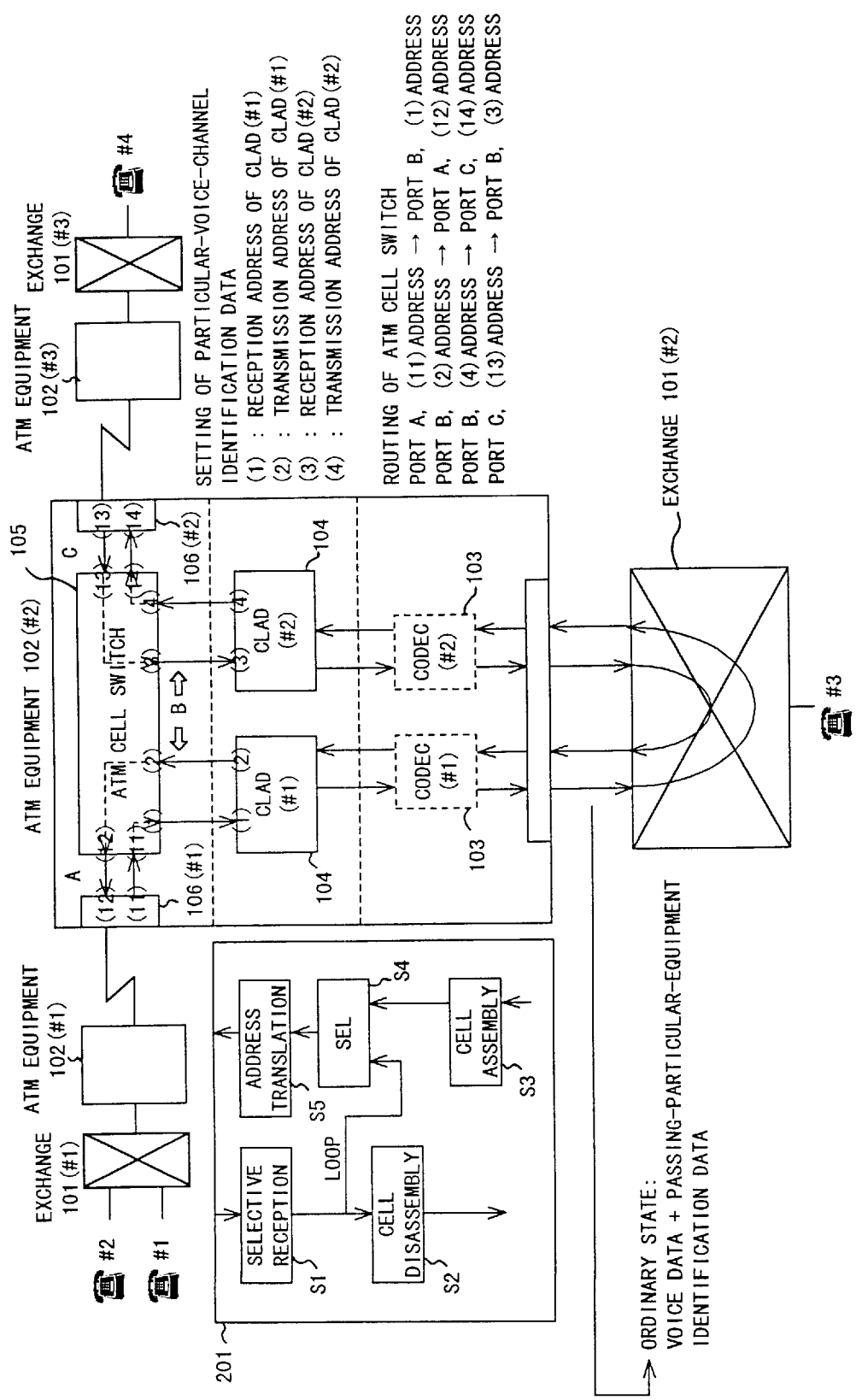
FIG. 9 is a diagram showing the architecture of the second preferred embodiment of the present invention (in the ordinary state thereof)
Figure 10:
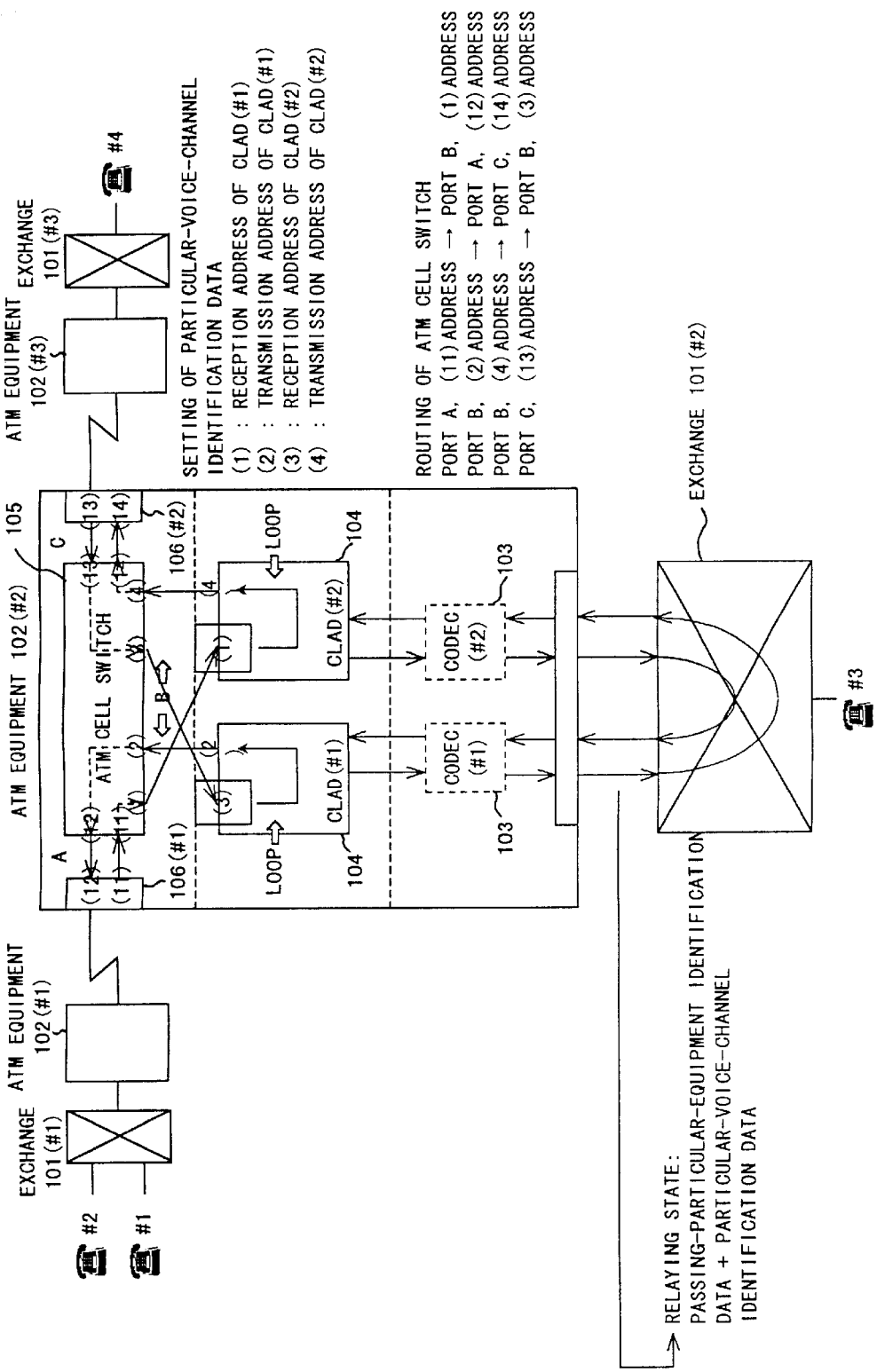
FIG. 10 is a diagram showing the architecture of the second preferred embodiment of the present invention (in the relaying state thereof)

FIGS. 9 and 10 are diagrams showing the construction of the second preferred embodiment of the present invention as based on the first fundamental architecture depicted in FIG. 5.

First, FIG. 9 illustrates an ordinary state being a control state correspondent to the path as to which the ATM equipment 102(#2) does not perform the relaying operation, and it is similar to FIG. 7 in the first preferred embodiment of the present invention.

Next, FIG. 10 illustrates a relaying state being a control state correspondent to the path as to which the ATM equipment 102(#2) performs the relaying operation.

Likewise to the case of FIG. 8 in the first preferred embodiment of the present invention, the relaying state corresponds to, for example, the state of the ATM equipment 102(#2) in the case where telephonic communications are held between the telephone set #1 connected to the exchange 101(#1) and the telephone set #4 connected to the exchange 101(#3).

The point of difference of the construction in FIG. 10 from the construction in FIG. 8 is that, after the detection of the passing-particular-equipment identification data indicating the relaying state, the two CLAD blocks 104 in the ATM equipment 102(#2) mutually exchange items of information on the reception addresses of ATM cells lying in the respective CODEC blocks 103, unlike the transmission addresses thereof, as the particular-voice-channel identification data.

More specifically, in the example of FIG. 10, the CLAD block 104(#1) notifies the reception address (1) of the ATM cell lying in the particular device 104(#1), to the CLAD block 104(#2) by utilizing the first time-division channel which is connected with the CLAD block 104(#2) via the exchange 101(#2).

On the other hand, also the CLAD block 104(#2) notifies the reception address (3) of the ATM cell lying in the particular device 104(#2), to the CLAD block 104(#1) by utilizing the second time-division channel which is connected with the CLAD block 104(#1) via the exchange 101(#2).

Upon receiving the reception address (3) from the CLAD block 104(#2), the CLAD block 104(#1) alters the setting of an ATM cell to be received by the particular device 104(#1), so as to receive the ATM cell whose header part bears a VPI/VCI value corresponding to the reception address (3), not the ATM cell whose header part bears a VPI/VCI value corresponding to the reception address (1).

Simultaneously, the CLAD block 104(#1) loops the ATM cell received by itself, back to a route for delivering this cell to the ATM cell switch block 105, without executing a process for converting this cell into coded voice data (LOOP at steps S1→S4 indicated within a square 201 in FIG. 9).

Besides, the ATM cell turned back has its header part endowed with a VPI/VCI value corresponding to the transmission address (2) set beforehand and is delivered to the ATM cell switch block 105, from which it is transferred to the line block 106(#1).

On the other hand, upon receiving the reception address (1) from the CLAD block 104(#1), the CLAD block 104(#2) alters the setting of an ATM cell to be received by the particular device 104(#2), so as to receive the ATM cell whose header part bears a VPI/VCI value corresponding to the reception address (1), not the ATM cell whose header part bears a VPI/VCI value corresponding to the reception address (3).

Simultaneously, the CLAD block 104(#2) loops the ATM cell received by itself, back to a route for delivering this cell to the ATM cell switch block 105, without executing a process for converting this cell into coded voice data.

Besides, the ATM cell turned back has its header part endowed with a VPI/VCI value corresponding to the transmission address (4) set beforehand and is delivered to the ATM cell switch block 105, from which it is transferred to the line block 106(#2).

As explained before with reference to FIG. 5, when the ATM cell switch block 105 has judged that the header part of the ATM cell received at the port A bears the VPI/VCI value corresponding to the transmission address (11) of the line block 106(#1), it rewrites the VPI/VCI value of the header part of the ATM cell, into a value corresponding to the reception address (1) at the port B, on the basis of previous setting. Thereafter, the resulting ATM cell is transferred into the ATM cell switch block 105. Besides, the ATM cell switch block 105 autonomously routes the above ATM cell so as to be transferred to the port B, on the basis of the port number information of the port A and the VPI/VCI value affixed to the header part of the ATM cell.

As also explained before with reference to FIG. 5, when the ATM cell switch block 105 has judged that the header part of the ATM cell received at the port C bears the VPI/VCI value corresponding to the transmission address (13) of the line block 106(#2), it rewrites the VPI/VCI value of the header part of the ATM cell, into a value corresponding to the reception address (3) at the port B, on the basis of previous setting. Thereafter, the resulting ATM cell is transferred into the ATM cell switch block 105. Besides, the ATM cell switch block 105 autonomously routes the above ATM cell so as to be transferred to the port B, on the basis of the port number information of the port C and the VPI/VCI value affixed to the header part of the ATM cell.

As the result of the above control operation, the ATM cell which contains the voice data directed to the exchange 101(#3) and which has been received from the ATM equipment 102(#1) by the line block 106(#1) included in the ATM equipment 102(#2) is directly received by the CLAD block 104(#2) included in the ATM equipment 102(#2), via the ATM cell switch block 105 included therein, and it is turned back in the CLAD block 104(#2). Further, the ATM cell is transferred to the line block 106(#2) included in the ATM equipment 102(#2), via the ATM cell switch block 105 included therein, and it is transmitted from the line block 106(#2) toward the ATM equipment 102(#3).

To the contrary, the ATM cell which contains the voice data directed to the exchange 101(#1) and which has been received from the ATM equipment 102(#3) by the line block 106(#2) included in the ATM equipment 102(#2) is directly received by the CLAD block 104(#1) included in the ATM equipment 102(#2), via the ATM cell switch block 105 included therein, and it is turned back in the CLAD block 104(#1). Further, the ATM cell is transferred to the line block 106(#1) included in the ATM equipment 102(#2), via the ATM cell switch block 105 included therein, and it is transmitted from the line block 106(#1) toward the ATM equipment 102(#1).

As a result, as in the case of the first preferred embodiment of the present invention, the ATM equipment 102(#2) is permitted to switch the voice data in the form of the ATM cell as it is, by executing neither the cell assembling/disassembling operation nor the coding/decoding operation, and the digital one-link relaying of voice is realized.

Third Preferred Embodiment of the Present Invention

Figure 11:
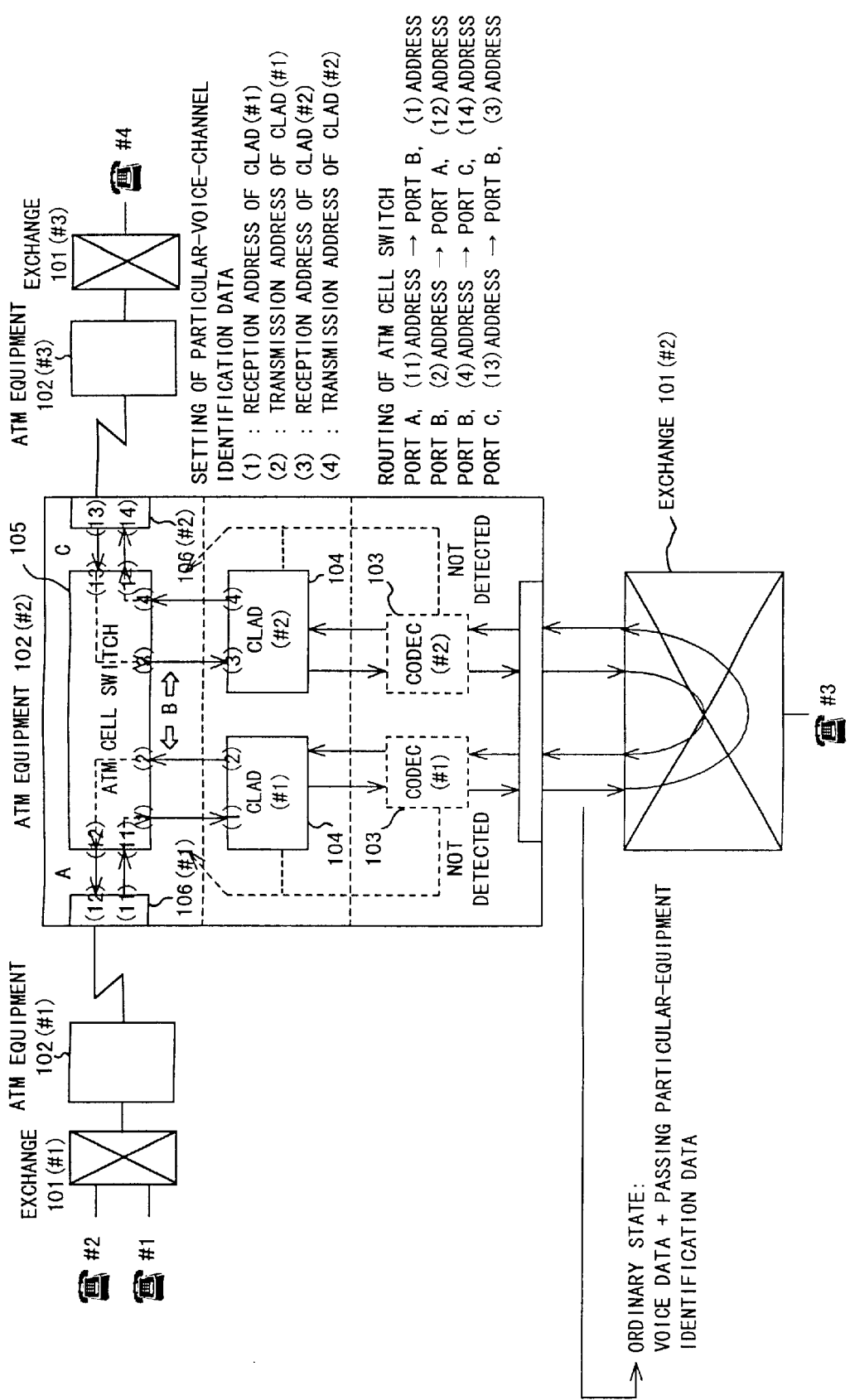
FIG. 11 is a diagram showing the architecture of the third preferred embodiment of the present invention (in the ordinary state thereof)
Figure 12:
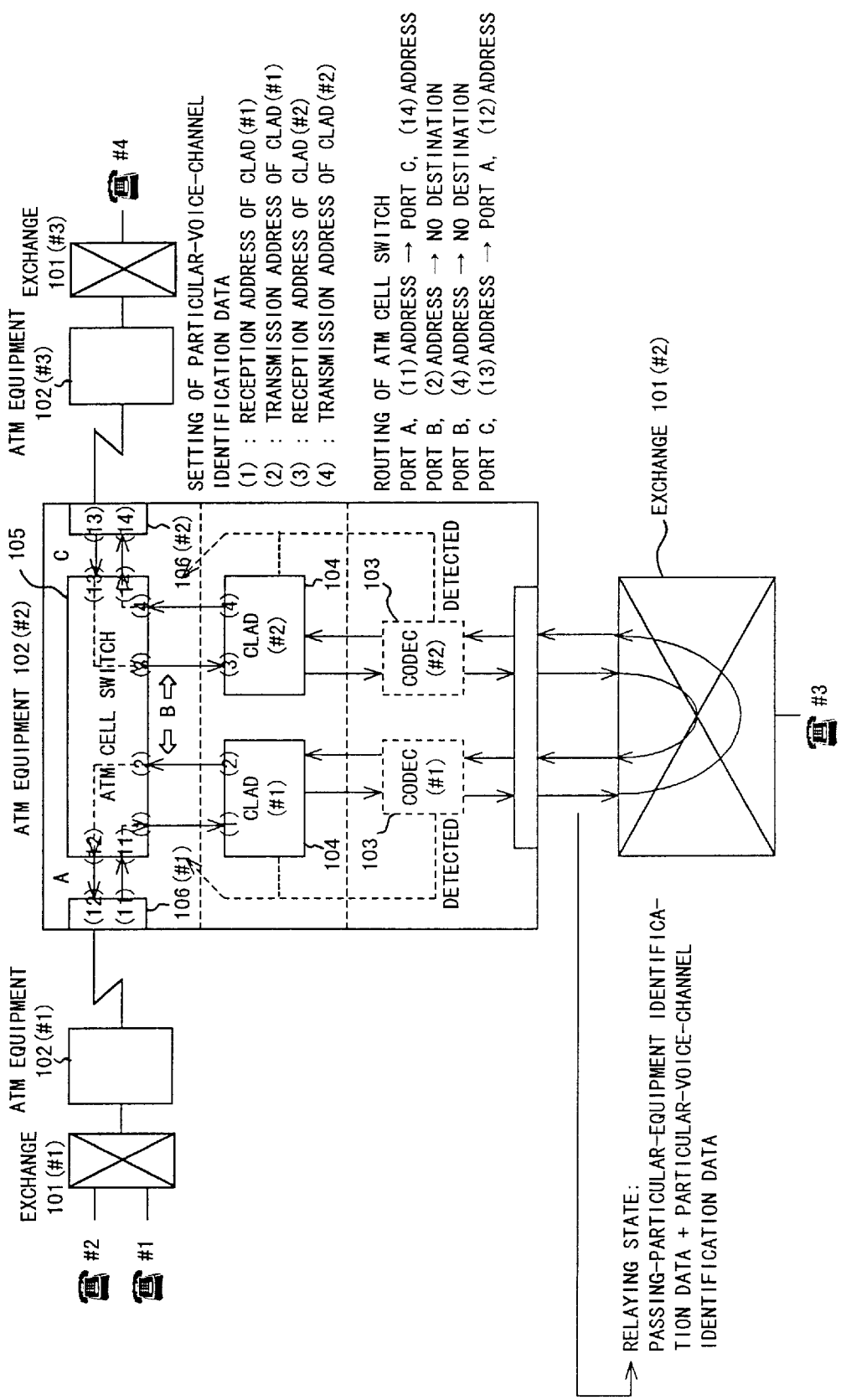
FIG. 12 is a diagram showing the architecture of the third preferred embodiment of the present invention (in the relaying state thereof)

FIGS. 11 and 12 are diagrams showing the construction of the third preferred embodiment of the present invention as based on the first or second fundamental architecture depicted in FIG. 5 or 6.

First, FIG. 11 illustrates an ordinary state being a control state correspondent to the path as to which the ATM equipment 102(#2) does not perform the relaying operation, and it is similar to FIG. 7 in the first preferred embodiment of the present invention.

Next, FIG. 12 illustrates a relaying state being a control state correspondent to the path as to which the ATM equipment 102(#2) performs the relaying operation.

Likewise to the case of FIG. 8 in the first preferred embodiment of the present invention, the relaying state corresponds to, for example, the state of the ATM equipment 102(#2) in the case where telephonic communications are held between the telephone set #1 connected to the exchange 101(#1) and the telephone set #4 connected to the exchange 101(#3).

The point of difference of the construction in FIG. 12 from the construction in FIG. 8 is that, after the detection of the passing-particular-equipment identification data indicating the relaying state, the two CLAD blocks 104 in the ATM equipment 102(#2) mutually exchange items of information on the transmission or reception addresses of ATM cells lying in the respective CODEC blocks 103 or items of information on the peculiar device numbers of the respective CODEC blocks 103, as the particular-voice-channel identification data, whereupon the respective CODEC blocks 103 do not perform the loop-back controls, but the relaying paths are altered so that the ATM cell switch block 105 may directly switch the pertinent ATM cells between the line blocks 106(#1) and 106(#2).

As a result, as in the cases of the first and second preferred embodiments of the present invention, the ATM equipment 102(#2) is permitted to switch the voice data in the form of the ATM cell as it is, by executing neither the cell assembling/disassembling operation nor the coding/decoding operation, and the digital one-link relaying of voice is realized.

Fourth Preferred Embodiment of the Present Invention

FIG. 13 is a diagram showing the construction of the fourth preferred embodiment of the present invention as based on the first or second fundamental architecture depicted in FIG. 5 or 6.

With the construction of the fourth preferred embodiment of the present invention, the functions of any of the first through third preferred embodiments described above are fulfilled, but the functions of inserting/detecting the passing-particular-equipment identification data, the functions of inserting/detecting the particular-voice-channel identification data, and the function of altering a relaying path as explained before are installed and closed in a CLAD device 901 having no CODEC blocks 103 of its own, and the CODEC blocks 103 are separated as an exchange termination device 902.

Alternatively, although not shown in FIG. 13, a relaying system may well be so constructed that the above functions are installed and closed in a CLAD device which has neither the CODEC blocks 103 nor an ATM cell switch block 105 of its own.

Owing to such a construction, the switching of ATM cells can be actualized by the CLAD device only.

It is also possible to realize an ATM equipment or a CLAD device which is connected to an exchange not requiring any CODEC block 103, and which has the function of altering a switching path relevant to the present invention.

There will now be described those practicable system architectures of the present invention which are more detailed architectures based on the foregoing preferred embodiments of the present invention.

Figure 14:
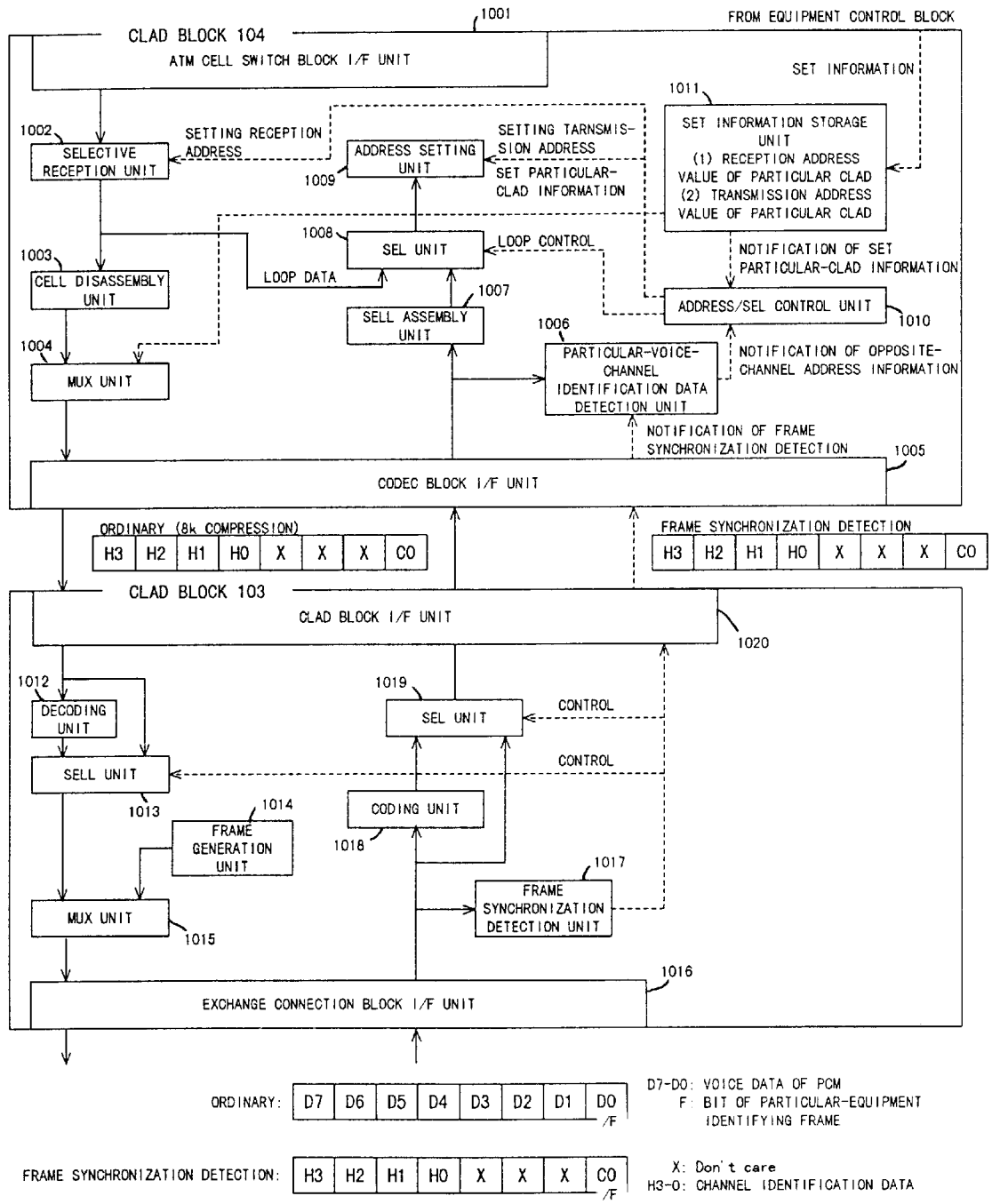
FIG. 14 is a diagram showing the architecture of a first practicable system which corresponds to the first and second preferred embodiments of the present invention.

First Practicable System Architecture Corresponding to the First/Second Preferred Embodiments of the Present Invention FIG. 14 is a block diagram showing the first practicable system architecture which concerns the CLAD block 104 and the CODEC block 103 corresponding to the foregoing first preferred embodiment of the present invention illustrated in FIGS. 7 and 8 or the foregoing second preferred embodiment of the present invention illustrated in FIGS. 9 and 10.

First, the CLAD block 104 will be described.

An ATM cell switch block I/F unit 1001 controls the interface of signals which are communicated between the ATM cell switch block 105 and the CLAD block 104 as shown in FIG. 5, etc.

A selective reception unit 1002 analyzes the header parts of ATM cells delivered from the ATM cell switch block 105, and it selects and receives only ATM cells which bear a VPI/VCI value corresponding to a reception address set by an address/SEL control unit 1010.

A cell disassembly unit 1003 disassembles the ATM cell delivered from the ATM cell switch block 105, and it derives only coded voice data set in the payload part of the ATM cell and sends the derived data toward the CODEC block 103.

An MUX unit 1004 multiplexes the transmission address value of the particular CLAD device (in the foregoing case of the first preferred embodiment of the present invention) or the reception address value of the particular CLAD device (in the foregoing case of the second preferred embodiment of the present invention) as is particular-CLAD set information stored in a set information storage unit 1011, as the particular-voice-channel identification data onto the output of the coded voice data delivered from the cell disassembly unit 1003. A data format here is as shown in FIG. 14, and data employing four bits H0–H3 is transmitted.

A CODEC block I/F unit 1005 controls the interface of signals which are communicated between the CODEC block 103 and the CLAD block 104.

A particular-voice-channel identification data detection unit 1006 begins to operate at the point of time at which it has been notified of the detection of a frame synchronization state correspondent to passing-particular-equipment identification data indicative of a relaying state by a frame synchronization detection unit 1017 to be explained later as is included in the CODEC block 103. Herein, the detection unit 1006 detects particular-voice-channel identification data notified via the exchange 101(#2) (refer to FIG. 5) by the opposing CLAD block 104 (opposing-channel address information notification).

A cell assembly unit 1007 assembles coded voice data received from the CODEC block 103, into an ATM cell.

An SEL unit 1008 selects either the ATM cell assembled by the cell assembly unit 1007 or the ATM cell looped back from the selective reception unit 1002.

An address setting unit 1009 sets the VPI/VCI value of the header part of the ATM cell outputted from the SEL unit 1008, to a value corresponding to the transmission address set by the address/SEL control unit 1010.

In a case where the functions corresponding to the first preferred embodiment of the present invention as explained before are fulfilled, the address/SEL control unit 1010 sets in the selective reception unit 1002 the reception address value of the particular CLAD device notified as the particular-CLAD set information notification by the set information storage unit 1011. Also, the address/SEL control unit 1010 selects either the transmission address value of the particular CLAD device notified as the particular-CLAD set information notification by the set information storage unit 1011 or transmission address value being the particular-voice-channel identification data notified as the opposing-channel address information notification by the particular-voice-channel identification data detection unit 1006, on the basis of the detected state of the particular-voice-channel identification data in the particular-voice-channel identification data detection unit 1006, and it sets the selected transmission address value in the address setting unit 1009.

On the other hand, in a case where the functions corresponding to the second preferred embodiment of the present invention as explained before are fulfilled, the address/SEL control unit 1010 sets in the address setting unit 1009 the transmission address value of the particular CLAD device notified as the particular-CLAD set information notification by the set information storage unit 1011. Also, the address/SEL control unit 1010 selects either the reception address value of the particular CLAD device notified as the particular-CLAD set information notification by the set information storage unit 1011 or reception address value being the particular-voice-channel identification data notified as the opposingchannel address information notification by the particular-voice-channel identification data detection unit 1006, on the basis of the detected state of the particular-voice-channel identification data in the particular-voice-channel identification data detection unit 1006, and it sets the selected reception address value in the selective reception unit 1002.

The set information storage unit 1011 stores therein the reception address value and transmission address value of the particular CLAD device assigned beforehand by an equipment control block, not especially shown, for controlling the operation of the whole ATM equipment 102.

First, a CLAD block I/F unit 1020 controls the interface of signals which are communicated between the CODEC block 103 and the CLAD block 104.

A decoding unit 1012 decodes original voice data from the coded voice data which has been received from the CLAD block 104.

On condition that an SEL unit 1013 is not notified of the detection of the frame synchronization state correspondent to the passing-particular-equipment identification data indicative of the relaying state by the frame synchronization detection unit 1017 to be explained later, it selects the original voice data outputted from the decoding unit 1012 and transmits the selected data toward the exchange 101(#2) (refer to FIG. 5). In contrast, on condition that the SEL unit 1013 is notified of the detection of the frame synchronization state by the frame synchronization detection unit 1017, it selects the particular-voice-channel identification data delivered from the CLAD block 104 and transmits the selected data toward the exchange 101(#2) (refer to FIG. 5).

An MUX unit 1015 superposes a bit sequence being the passing-particular-equipment identification data indicative of the relaying state as generated by a frame generation unit 1014, on the original voice data or particular-voice-channel identification data outputted from the SEL unit 1013, and it transmits the resulting data toward the exchange 101(#2) (refer to FIG. 5).

An exchange connection block I/F unit 1016 controls the interface of signals which are communicated between the CODEC block 103 and the exchange 101(#2) (refer to FIG. 5).

The frame synchronization detection unit 1017 detects the bit sequence being the passing-particular-equipment identification data indicative of the relaying state, as the frame synchronization state from the original voice data or particular-voice-channel identification data received from the exchange 101.

A coding unit 1018 codes and compresses the original voice data received from the exchange 101, and it transmits the resulting coded voice data toward the CLAD block 104.

On condition that an SEL unit 1019 is not notified of the detection of the frame synchronization state correspondent to the passing-particular-equipment identification data indicative of the relaying state by the frame synchronization detection unit 1017, it selects the coded voice data outputted from the coding unit 1018 and transmits the selected data toward the CLAD block 104. In contrast, on condition that the SEL unit 1019 is notified of the detection of the frame synchronization state by the frame synchronization detection unit 1017, it selects the particular-voice-channel identification data notified via the exchange 101(#2) (refer to FIG. 5) by the opposing CLAD block 104 and transmits the selected data toward the CLAD block 104.

Figure 18:
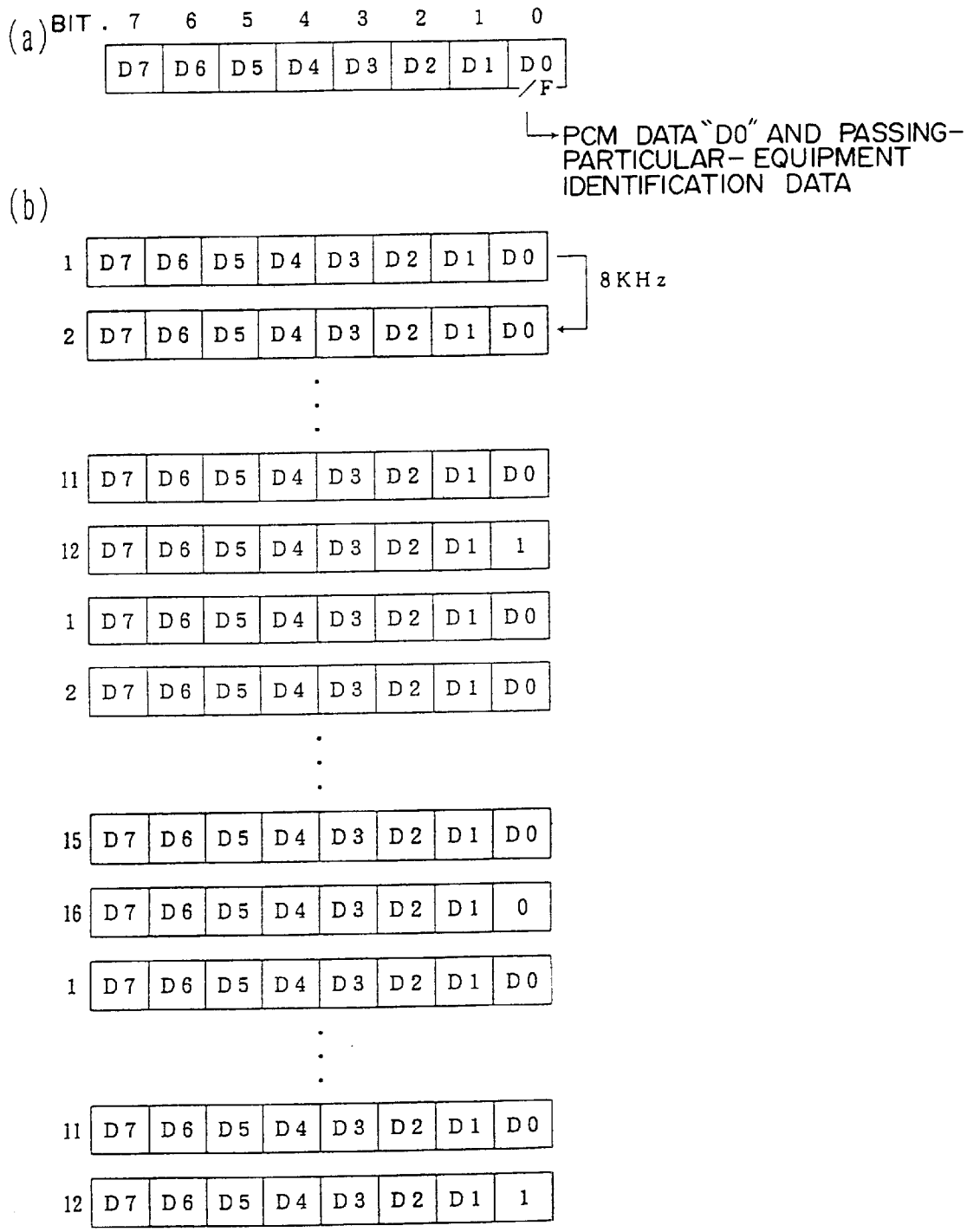
FIG. 18 is a diagram showing the frame format of passing-particular-equipment identification data.

FIG. 18 is a diagram showing the frame format of the bit sequence of the passing-particular-equipment identification data which is generated by the frame generation unit 1014 included in the CLAD block 104, and which is superposed on the voice data.

On the time division channel, the voice data are transmitted in units of sample data of 8 bits consisting of bits 0–7, and the rate of sampling is 8 kHz. Consequently, one time-division channel can transmit PCM voice data having a transmission rate of 8 bits×8000=64 kilobits/second.

After eleven voice sample data have been sent as illustrated at (b) in FIG. 18 on the time division channel which becomes the relaying state, the frame generation unit 1014 invalidates the least significant bit (bit 0) of the twelfth voice sample data as illustrated at (a) in FIG. 18, and it superposes a value 1 on the bit position as a passing-particular-equipment identification data bit F.

Subsequently, after fifteen voice sample data have been sent on the time division channel, the frame generation unit 1014 invalidates the least significant bit of the sixteenth voice sample data as illustrated at (a) in FIG. 18, and it superposes a value 0 on the bit position as the passing-particular-equipment identification data bit F.

Further, after eleven voice sample data have been sent again on the time division channel, the frame generation unit 1014 invalidates the least significant bit of the twelfth voice sample data, and it superposes the value 1 on the bit position as the passing-particular-equipment identification data bit F.

In this way, the passing-particular-equipment identification data indicative of the relaying state are actualized as the frame bit sequence which alternates as 0→(waiting for 12 samples)→1→(waiting for 16 samples)→0→(waiting for 12 samples)→1. On this occasion, the interval of the frame bits to be inserted is held at a sufficiently large one such as 12 samples or 16 samples. Therefore, the degradation of the quality of voice to be transmitted can be suppressed to the minimum, while at the same time, reliable pull-in can be attained.

When the frame synchronization detection unit 1017 has detected the above alterations of 0 and 1 ninety-six times by way of example, it recognizes the frame synchronization state corresponding to the passing-particular-equipment identification data indicative of the relaying state. In contrast, when the frame synchronization detection unit 1017 is not detecting the frame synchronization state, it recognizes that the passing-particular-equipment identification data indicative of a non-relaying state are being sent.

With the above construction of the CLAD block 104 as well as the CODEC block 103 shown in FIG. 14, in the ordinary state (the foregoing state shown in FIG. 7 or FIG. 9) in which the frame synchronization detection unit 1017 included in the CODEC block 103 is not detecting the frame synchronization state, controls to be described below are performed on the basis of the detection output of the detection unit 1017 and the control state in the address/SEL control unit 1010.

First, the selective reception unit 1002 in the CLAD block 104 is controlled so as to receive only the ATM cell whose header part bears the VPI/VCI value corresponding to the reception address value of the particular CLAD device stored in the set information storage unit 1011.

In addition, the SEL unit 1008 in the CLAD block 104 is controlled so as to select the ATM cell which has been assembled by the cell assembly unit 1007.

Besides, the address setting unit 1009 in the CLAD block 104 is controlled so as to set the VPI/VCI value corresponding to the transmission address value of the particular CLAD device stored in the set information storage unit 1011, in the header part of the ATM cell which is to be sent to the ATM cell switch block 105.

Further, the MUX unit 1004 in the CLAD block 104 outputs only the coded voice data which is delivered from the cell disassembly unit 1003.

On the other hand, the SEL unit 1013 in the CODEC block 103 is controlled so as to select the original voice data which has been decoded by the decoding unit 1012.

In addition, the MUX unit 1015 in the CODEC block 103 outputs only the original voice data which is delivered from the SEL unit 1013.

Further, the SEL unit 1019 is controlled so as to select the coded voice data which is outputted from the coding unit 1018.

Next, in the relaying state (the foregoing state shown in FIG. 8 or FIG. 10) in which the frame synchronization detection unit 1017 included in the CODEC block 103 is detecting the frame synchronization state, controls to be described below are performed on the basis of the detection output of the detection unit 1017, the detection result in the particular-voice-channel identification data detection unit 1006 and the control state in the address/SEL control unit 1010.

First, in the case where the functions corresponding to the first preferred embodiment of the present invention as explained before are fulfilled, the selective reception unit 1002 in the CLAD block 104 is controlled so as to receive only the ATM cell whose header part bears the VPI/VCI value corresponding to the reception address value of the particular CLAD device stored in the set information storage unit 1011.

In addition, the SEL unit 1008 in the CLAD block 104 is controlled so as to select the ATM cell which is looped back from the selective reception unit 1002.

Besides, the address setting unit 1009 in the CLAD block 104 is controlled so as to set the VPI/VCI value corresponding to the transmission address value of the opposing CLAD block 104 as is notified as the particular-voice-channel identification data by the particular-voice-channel identification data detection unit 1006, in the header part of the ATM cell which is to be sent to the ATM cell switch block 105.

Further, the MUX unit 1004 in the CLAD block 104 outputs as the particular-voice-channel identification data the transmission address value of the particular CLAD device as is the particular-CLAD set information stored in the set information storage unit 1011.

On the other hand, the SEL unit 1013 in the CODEC block 103 is controlled so as to select the particular-voice-channel identification data outputted from the CLAD block 104, without selecting the output of the decoding unit 1012.

Besides, in the MUX unit 1015 included in the CLAD block 104, the frame bit sequence which has been generated by the frame generation unit 1014 and which corresponds to the passing-particular-equipment identification data indicative of the relaying state is superposed on the particular-voice-channel identification data delivered from the SEL unit 1013.

Further, the SEL unit 1019 is controlled so as to select the particular-voice-channel identification data notified via the exchange 101(#2) by the opposing CLAD block 104, without selecting the output of the coding unit 1018.

Next, in the case where the functions corresponding to the second preferred embodiment of the present invention as explained before are fulfilled, the selective reception unit 1002 in the CLAD block 104 is controlled so as to receive only the ATM cell whose header part bears the VPI/VCI value corresponding to the reception address value of the opposing CLAD block 104 as is notified as the particular-voice-channel identification data by the particular-voice-channel identification data detection unit 1006.

In addition, the SEL unit 1008 in the CLAD block 104 is controlled so as to select the ATM cell which is looped back from the selective reception unit 1002.

Besides, the address setting unit 1009 in the CLAD block 104 is controlled so as to set the VPI/VCI value corresponding to the transmission address value of the particular CLAD device as is stored in the set information storage unit 1011, in the header part of the ATM cell which is to be sent to the ATM cell switch block 105.

Further, the MUX unit 1004 in the CLAD block 104 outputs as the particular-voice-channel identification data the reception address value of the particular CLAD device as is the particular-CLAD set information stored in the set information storage unit 1011.

On the other hand, the SEL unit 1013 in the CODEC block 103 is controlled so as to select the particular-voice-channel identification data outputted from the CLAD block 104, without selecting the output of the decoding unit 1012.

Besides, in the MUX unit 1015 included in the CLAD block 104, the frame bit sequence which has been generated by the frame generation unit 1014 and which corresponds to the passing-particular-equipment identification data indicative of the relaying state is superposed on the particular-voice-channel identification data delivered from the SEL unit 1013.

Further, the SEL unit 1019 is controlled so as to select the particular-voice-channel identification data notified via the exchange 101(#2) by the opposing CLAD block 104, without selecting the output of the coding unit 1018.

Owing to the above control operations, the foregoing functions of the first or second preferred embodiment of the present invention are realized.

Figure 15:
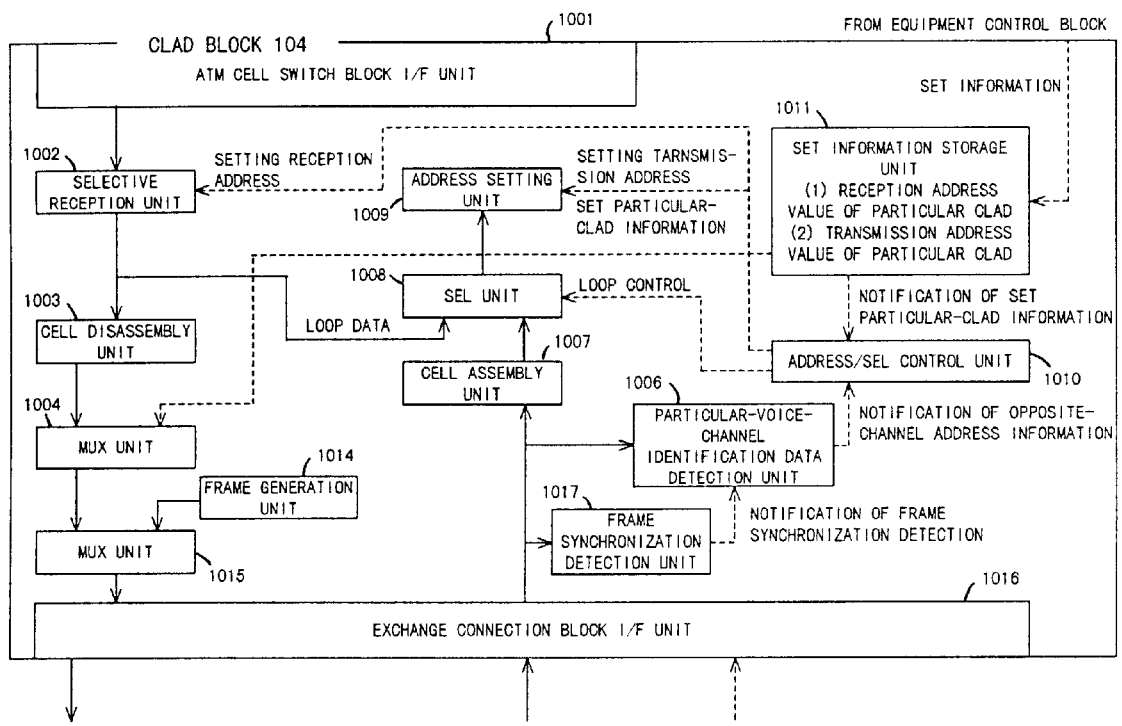
FIG. 15 is a diagram showing the architecture of a second practicable system which corresponds to the first, second and fourth preferred embodiments of the present invention.

Second Practicable System Architecture Corresponding to the First/Second/Fourth Preferred Embodiments of the Present Invention FIG. 15 is a block diagram showing the second practicable system architecture which concerns the CLAD block 104 corresponding to the foregoing first preferred embodiment of the present invention illustrated in FIGS. 7 and 8, or the foregoing second preferred embodiment of the present invention illustrated in FIGS. 9 and 10, and the foregoing fourth preferred embodiment of the present invention illustrated in FIG. 13.

In the architecture shown in FIG. 15, the functions of the frame generation unit 1014 and the MUX unit 1015 and the function of the frame synchronization detection unit 1017 as are installed within the CODEC block 103 in the architecture shown in FIG. 14 are intensively packaged within the CLAD block 104.

Owing to such a construction, the switching of ATM cells can be actualized by an ATM equipment having no CODEC blocks 103 or by the CLAD device only, as explained before in conjunction with the fourth preferred embodiment of the present invention.

Figure 16:
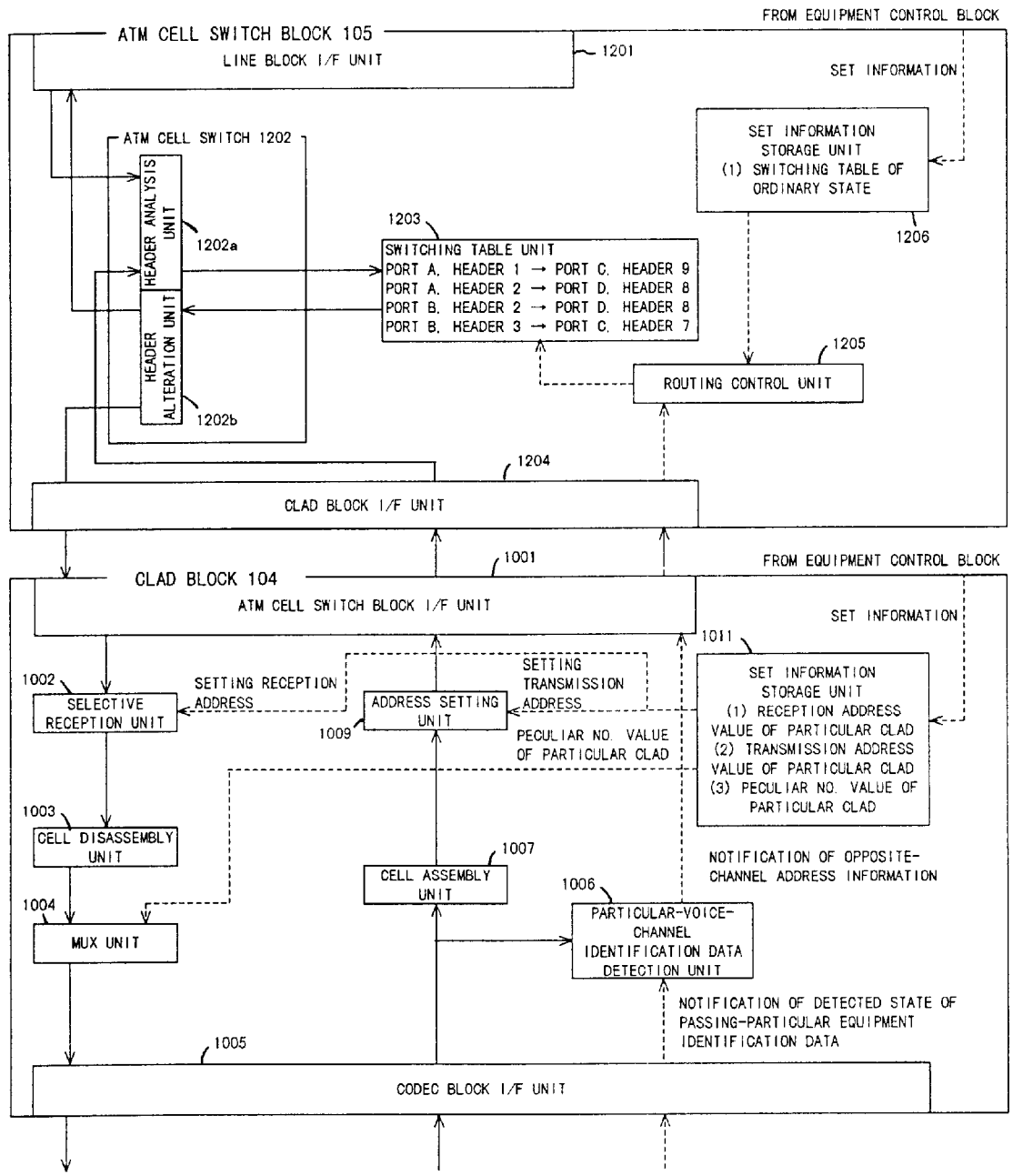
FIG. 16 is a diagram showing the architecture of a third practicable system which corresponds to the third preferred embodiment of the present invention.

Third Practicable System Architecture Corresponding to the Third Preferred Embodiment of the Present Invention FIG. 16 is a block diagram showing the third practicable system architecture which concerns the ATM cell switch block 105 and the CLAD block 104 corresponding to the foregoing third preferred embodiment of the present invention illustrated in FIGS. 11 and 12.

Although the construction of the CLAD block 104 is almost the same as in the case of the first practicable system architecture shown in FIG. 14, a particular-CLAD peculiar number value is set and stored in the set information storage unit 1011 by an equipment control block not especially shown, and it is outputted as particular-voice-channel identification data.

Besides, a switching path is altered in the ATM cell switch block 105, not in the CLAD block 104, as explained before in conjunction with the third preferred embodiment of the present invention illustrated in FIGS. 11 and 12. Therefore, the SEL unit 1008 and the address/SEL control unit 1010 for performing the loop-back control as shown in FIG. 14 are not installed in the construction shown in FIG. 16.

The construction of the CODEC block 103 is the same as in the case of FIG. 14.

In the ATM cell switch block 105, a transmission line block I/F unit 1201 controls the interface of signals which are communicated between the line block 106 (refer to FIG. 11) and the ATM cell switch block 105.

A CLAD block I/F unit 1204 controls the interface of signals which are communicated between the ATM cell switch block 105 and the CLAD block 104.

An ATM cell switch 1202 autonomously routes an ATM cell received from the line block I/F unit 1201 or the CLAD block I/F unit 1204 on the basis of the contents of a switching table unit 1203 which stores switching information therein, and a VPI/VCI value which is affixed to the header part of the ATM cell.

Prior to the routing, a header analysis unit 1202a included in the ATM cell switch 1202 analyzes the VPI/VCI value set in the header part of the received ATM cell. On the basis of the result of the analysis, a header alteration unit 1202b included in the ATM cell switch 1202 rewrites the VPI/VCI value contained in the header part, into a value corresponding to the block of the destination of the ATM cell.

Here, in the ordinary state, a routing control unit 1205 sets the switching table of this ordinary state stored in a set information storage unit 1206, in the switching table unit 1203. Then, the header alteration unit 1202b performs a routing control as explained below, on the basis of the set contents of the switching table unit 1203.

By way of example, in the construction shown in FIG. 11, when the header analysis unit 1202a has judged that the header part of the ATM cell received at the port A (line block I/F unit 1201) bears the VPI/VCI value corresponding to the transmission address (11) of the line block 106(#1), the header alteration unit 1202b rewrites the VPI/VCI value of the header part of the ATM cell, into a value corresponding to the reception address (1) of the CLAD block 104(#1) connected to the port B, and it thereafter transfers the resulting ATM cell into the ATM cell switch 1202. As a result, the ATM cell switch 1202 autonomously routes the above ATM cell so as to be transferred to the port B (CLAD block I/F unit 1204), on the basis of the port number information of the port A and the VPI/VCI value affixed to the header part of the ATM cell.

Besides, when the header analysis unit 1202a has judged that the header part of the ATM cell received at the port C (line block I/F unit 1201) bears the VPI/VCI value corresponding to the transmission address (13) of the line block 106(#2), the header alteration unit 1202b rewrites the VPI/VCI value of the header part of the ATM cell, into a value corresponding to the reception address (3) of the CLAD block 104(#2) connected to the port B, and it thereafter transfers the resulting ATM cell into the ATM cell switch 1202. As a result, the ATM cell switch 1202 autonomously routes the above ATM cell so as to be transferred to the port B, on the basis of the port number information of the port C and the VPI/VCI value affixed to the header part of the ATM cell.

Also, when the header analysis unit 1202a has judged that the header part of the ATM cell received at the port B bears the VPI/VCI value corresponding to the transmission address (2) of the CLAD -block 104(#1), the header alteration unit 1202b rewrites the VPI/VCI value of the header part of the ATM cell, into a value corresponding to the reception address (12) of the line block 106(#1) connected to the port A, and it thereafter transfers the resulting ATM cell into the ATM cell switch 12.02. As a result, the ATM cell switch 1202 autonomously routes the above ATM cell so as to be transferred to the port A, on the basis of the port number information of the port B and the VPI/VCI value affixed to the header part of the ATM cell.

Further, when the header analysis unit 1202a has judged that the header part of the ATM cell received at the port B bears the VPI/VCI value corresponding to the transmission address (4) of the CLAD block Tm 104(#2), the header alteration unit 1202b rewrites the VPI/VCI value of the header part of the ATM cell, into a value corresponding to the reception address (14) of the line block 106(#2) connected to the port C, and it thereafter transfers the resulting ATM cell into the ATM cell switch 1202. As a result, the ATM cell switch 1202 autonomously routes the above ATM cell so as to be transferred to the port C, on the basis of the port number information of the port B and the VPI/VCI value affixed to the header part of the ATM cell.

On the other hand, when the relaying state has occurred, the routing control unit 1205 sets in the switching table unit 1203 the switching table of this relaying state correspondent to the particular-CLAD peculiar number value concerning the CLAD block 104 as is notified as particular-voice-channel identification data (opposing-channel address information notification) by a particular-voice-channel identification data detection unit 1006 included in the CLAD block 104. Then, the header alteration unit 1202b performs a routing control as explained below, on the basis of the set contents of the switching table unit 1203.

By way of example, in the construction shown in FIG. 12, when the header analysis unit 1202a has judged that the header part of the ATM cell received at the port A (line block I/F unit 1201) bears the VPI/VCI value corresponding to the transmission address (11) of the line block 106(#1), the header alteration unit 1202b rewrites the VPI/VCI value of the header part of the ATM cell, into a value corresponding to the reception address (14) of the line block 106(#1) connected to the port C, and it thereafter transfers the resulting ATM cell into the ATM cell switch 1202. As a result, the ATM cell switch 1202 autonomously routes the above ATM cell so as to be transferred to the port C (line block I/F unit 1201), on the basis of the port number information of the port A and the VPI/VCI value affixed to the header part of the ATM cell.

Besides, when the header analysis unit 1202a has judged that the header part of the ATM cell received at the port C (line block I/F unit 1201) bears the VPI/VCI value corresponding to the transmission address (13) of the line block 106(#2), the header alteration unit 1202b rewrites the VPI/VCI value of the header part of the ATM cell, into a value corresponding to the reception address (12) of the line block 106(#1) connected to the port A, and it thereafter transfers the resulting ATM cell into the ATM cell switch 1202. As a result, the ATM cell switch 1202 autonomously routes the above ATM cell so as to be transferred to the port A, on the basis of the port number information of the port C and the VPI/VCI value affixed to the header part of the ATM cell.

In this way, the ATM cell switch block 105 alters the switching paths so that the pertinent ATM cells may be directly switched between the line blocks 106(#1) and 106(#2). Thus, the foregoing functions of the third preferred embodiment of the present invention are realized.

Figure 17:
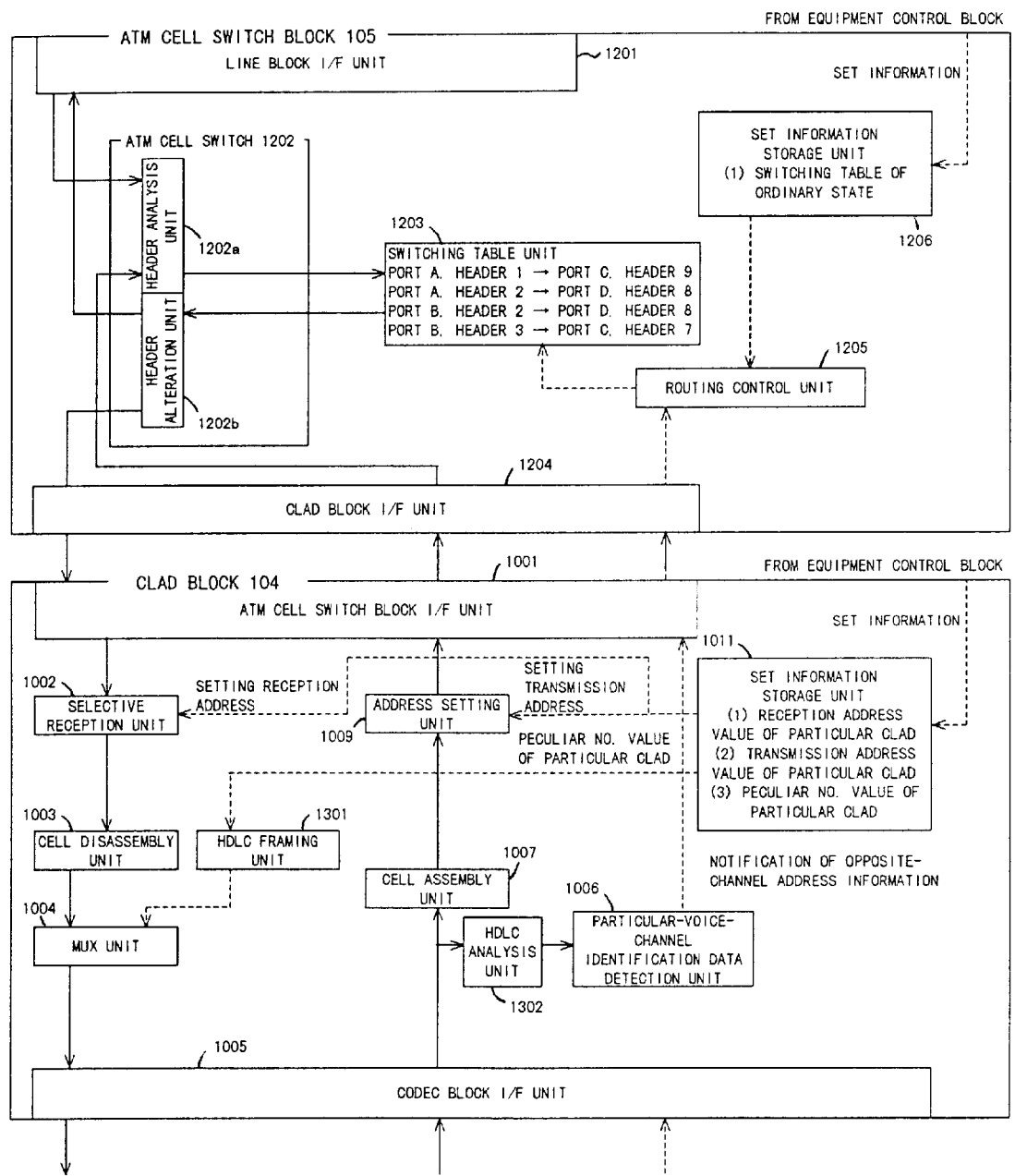
FIG. 17 is a diagram showing the architecture of a fourth practicable system which corresponds to the third preferred embodiment of the present invention.

Fourth Practicable System Architecture Corresponding to the Third Preferred Embodiment of the Present Invention FIG. 17 is a block diagram showing the fourth practicable system architecture which concerns the ATM cell switch block 105 and the CLAD block 104 corresponding to the foregoing third preferred embodiment of the present invention illustrated in FIGS. 11 and 12.

The construction of the ATM cell switch block 105 is the same as in the case of the third practicable system architecture shown in FIG. 16. Also, the construction of the CLAD block 104 is almost the same as in the case of the third practicable system architecture shown in FIG. 16. However, when the particular-CLAD peculiar number value is to be outputted as the particular-voice-channel identification data from the MUX unit 1004, it is put into an HDLC (High-level Data Link Control) frame by an HDLC framing unit 1301. In correspondence with the framing operation, an HDLC analysis unit 1302 is arranged on this side of the particular-voice-channel identification data detection unit 1006. The HDLC analysis unit 1302 derives data in which the particular-voice-channel identification data can be contained, from a received HDLC frame, and it delivers the derived data to the particular-voice-channel identification data detection unit 1006.

Owing to such a construction, the communications of control data of higher precision are realized. Moreover, the passing-particular-equipment identification data can be framed in accordance with the HDLC. In this case, the relaying of ATM cells can be actualized by an ATM equipment having no CODEC blocks 103 or by the CLAD device only.

What is claimed is:

1. A cell transmission equipment having a function of assembling communication data received from an exchange, into a cell of fixed length, and then transmitting the cell to a cell transmission network, a function of receiving communication data in the form of a cell, from the cell transmission network, and thereafter disassembling the cell and transmitting the resulting communication data to the exchange, and a function of determining a communication channel inside the equipment for use in connecting the equipment with the exchange, on the basis of data contained in a cell being processed within the equipment, comprising:

a passing-particular-equipment identification data insertion circuit which inserts passing-particular-equipment identification data into said communication data to be transmitted to said exchange, the passing-particular-equipment identification data serving to identify whether or not said communication data is in a relaying state in which it is to be relayed by the particular equipment;

a passing-particular-equipment identification data reception circuit which receives said passing-particular-equipment identification data from within the communication data received from said exchange;

a particular-communication-channel identification data insertion circuit which inserts particular-communication-channel identification data into said communication data to be transmitted to said exchange, the particular-communication-channel identification data indicating a communication channel of a cell correspondent to said communication data, when the received passing-particular-equipment identification data indicates the relaying state;

a particular-communication-channel identification data reception circuit which receives said particular-communication-channel identification data from within said communication data received from said exchange; and a cell route alteration circuit which alters a route of the cell inside said equipment, on the basis of the received particular-communication-channel identification data, wherein when the received passing-particular-equipment identification data indicates the relaying state, the communication channel of a cell correspondent to said communication data bypasses the function of assembling communication data.

2. A cell transmission equipment having a cell assembly/disassembly device which assembles communication data received from an exchange, into a cell of fixed length, and then transmits the cell to a cell transmission network, and which receives communication data in the form of a cell, from the cell transmission network, and thereafter disassembles the cell and transmits the resulting communication data to the exchange, and a function of determining a communication channel inside the equipment for use in connecting the equipment with the exchange, on the basis of data contained in a cell being processed within the equipment, comprising:

a passing-particular-equipment identification data insertion circuit which inserts passing-particular-equipment identification data into said communication data to be transmitted to said exchange, the passing-particular-equipment identification data serving to identify whether or not said communication data is in a relaying state in which it is to be relayed by the particular equipment;

a passing-particular-equipment identification data reception circuit which receives said passing-particular-equipment identification data from within the communication data received from said exchange;

a particular-communication-channel identification data insertion circuit which inserts particular-communication-channel identification data into said communication data to be transmitted to said exchange, the particular-communication-channel identification data indicating a transmitting communication channel of the cell assembly/disassembly device which is processing the cell correspondent to said communication data, when the received passing-particular-equipment identification data indicates the relaying state;

a particular-communication-channel identification data reception circuit which receives said particular-communication-channel identification data from within said communication data received from said exchange;

a loop-back circuit which loops said cell received from said cell transmission network by said cell assembly/disassembly device, back to a side of said cell transmission network, when said passing-particular-equipment identification data which is contained in said cell assembly/disassembly device being processing said cell correspondent to said communication data received from said exchange and which has been received together with said communication data indicates said relaying state; and a cell route alteration circuit which alters a route of said cell inside said equipment in said cell assembly/disassembly device, in such a way that the transmitting communication channel of said cell to be looped back is altered to one which is indicated by said particular-communication-channel identification data received from said exchange together with said communication data, wherein when the received passing-particular-equipment identification data indicates the relaying state, the communication channel of a cell correspondent to said communication data bypasses the function of assembling communication data.

3. A cell transmission equipment having a cell assembly/disassembly device which assembles communication data received from an exchange, into a cell of fixed length, and then transmits the cell to a cell transmission network, and which receives communication data in the form of a cell, from the cell transmission network, and thereafter disassembles the cell and transmits the resulting communication data to the exchange, and a function of determining a communication channel inside the equipment for use in connecting the equipment with the exchange, on the basis of data contained in a cell being processed within the equipment, comprising:

a passing-particular-equipment identification data insertion circuit which inserts passing-particular-equipment identification data into said communication data to be transmitted to said exchange, the passing-particular-equipment identification data serving to identify whether or not said communication data is in a relaying state in which it is to be relayed by the particular equipment;

a passing-particular-equipment identification data reception circuit which receives said passing-particular-equipment identification data from within the communication data received from said exchange;

a particular-communication-channel identification data insertion circuit which inserts particular-communication-channel identification data into said communication data to be transmitted to said exchange, the particular-communication-channel identification data indicating a receiving communication channel of the cell assembly/disassembly device which is processing the cell correspondent to said communication data, when the received passing-particular-equipment identification data indicates the relaying state;

a particular-communication-channel identification data reception circuit which receives said particular-communication-channel identification data from within said communication data received from said exchange;

a loop-back circuit which loops said cell received from said cell transmission network by said cell assembly/disassembly device, back to a side of said cell transmission network, when said passing-particular-equipment identification data which is contained in said cell assembly/disassembly device being processing said cell correspondent to said communication data received from said exchange and which has been received together with said communication data indicates said relaying state; and a cell route alteration circuit which alters a route of said cell inside said equipment in said cell assembly/disassembly device, in such a way that the receiving communication channel of said cell to be received from said cell transmission network is altered to one which is indicated by said particular-communication-channel identification data received from said exchange together with said communication data.

4. A cell transmission equipment having a function of assembling communication data received from an exchange, into a cell of fixed length, switching the cell, and thereafter transmitting the cell to a cell transmission network, a function of receiving communication data in the form of a cell, from the cell transmission network, switching the cell, and thereafter disassembling the cell and transmitting the resulting communication data to the exchange, and a function of determining a communication channel inside the equipment for use in connecting the equipment with the exchange, on the basis of data contained in a cell being processed within the equipment, comprising:

a passing-particular-equipment identification data insertion circuit which inserts passing-particular-equipment identification data into said communication data to be transmitted to said exchange, the passing-particular-equipment identification data serving to identify whether or not said communication data is in a relaying state in which it is to be relayed by the particular equipment;

a passing-particular-equipment identification data reception circuit which receives said passing-particular-equipment identification data from within the communication data received from said exchange;

a particular-communication-channel identification data insertion circuit which inserts particular-communication-channel identification data into said communication data to be transmitted to said exchange, the particular-communication-channel identification data indicating a communication channel of a cell correspondent to said communication data, when the received passing-particular-equipment identification data indicates the relaying state;

a particular-communication-channel identification data reception circuit which receives said particular-communication-channel identification data from within said communication data received from said exchange; and a cell-switching-route alteration circuit which alters a switching route of the cell inside said equipment, on the basis of the received particular-communication-channel identification data.

5. A cell transmission equipment having a function of assembling communication data received from an exchange, into a cell of fixed length, and then transmitting the cell to a cell transmission network, a function of receiving communication data in the form of a cell, from the cell transmission network, and thereafter disassembling the cell and transmitting the resulting communication data to the exchange, and a function of determining a communication channel inside the equipment for use in connecting the equipment with the exchange, on the basis of peculiar device identification information for identifying each of data processing units included in the equipment, comprising:

a passing-particular-equipment identification data insertion circuit which inserts passing-particular-equipment identification data into said communication data to be transmitted to said exchange, the passing-particular-equipment identification data serving to identify whether or not said communication data is in a relaying state in which it is to be relayed by the particular equipment;

a passing-particular-equipment identification data reception circuit which receives said passing-particular-equipment identification data from within the communication data received from said exchange;

a particular-communication-channel identification data insertion circuit which inserts particular-communication-channel identification data into said communication data to be transmitted to said exchange, the particular-communication-channel identification data being the peculiar device identification information for identifying the data processing unit in which said communication data to be transmitted or a cell correspondent to said communication data is processed, when the received passing-particular-equipment identification data indicates the relaying state;

a particular-communication-channel identification data reception circuit which receives said particular-communication-channel identification data from within said communication data received from said exchange; and a cell route alteration circuit which alters a route of the cell inside said equipment, on the basis of the received particular-communication-channel identification data.

6. A cell transmission equipment having a function of assembling communication data received from an exchange, into a cell of fixed length, switching the cell, and thereafter transmitting the cell to a cell transmission network, a function of receiving communication data in the form of a cell, from the cell transmission network, switching the cell, and thereafter disassembling the cell and transmitting the resulting communication data to the exchange, and a function of determining a communication channel inside the equipment for use in connecting the equipment with the exchange, on the basis of data contained in a cell being processed within the equipment, comprising:

a passing-particular-equipment identification data insertion circuit which inserts passing-particular-equipment identification data into said communication data to be transmitted to said exchange, the passing-particular-equipment identification data serving to identify whether or not said communication data is in a relaying state in which it is to be relayed by the particular equipment;

a passing-particular-equipment identification data reception circuit which receives said passing-particular-equipment identification data from within the communication data received from said exchange;

a particular-communication-channel identification data insertion circuit which inserts particular-communication-channel identification data into said communication data to be transmitted to said exchange, the particular-communication-channel identification data being the peculiar device identification information for identifying a data processing unit in which said communication data to be transmitted or a cell correspondent to said communication data is processed, when the received passing-particular-equipment identification data indicates the relaying state;

a particular-communication-channel identification data reception circuit which receives said particular-communication-channel identification data from within said communication data received from said exchange; and a cell-switching-route alteration circuit which alters a switching route of the cell inside said equipment, on the basis of the received particular-communication-channel identification data.

\* \* \* \* \*